(12) United States Patent
Creque et al.

(10) Patent No.: US 12,417,661 B2
(45) Date of Patent: Sep. 16, 2025

(54) THEFT DETERRING PRODUCT DISPLAY

(71) Applicants: Andrew J. Creque, Macedonia, OH (US); Gina M. Lanese, Stow, OH (US); Jeffry A. Myler, Stow, OH (US); Allan N. Forchione, Canton, OH (US); Troy Kollar, Parma, OH (US)

(72) Inventors: Andrew J. Creque, Macedonia, OH (US); Gina M. Lanese, Stow, OH (US); Jeffry A. Myler, Stow, OH (US); Allan N. Forchione, Canton, OH (US); Troy Kollar, Parma, OH (US)

(73) Assignee: DARKO, INC., Bedford Heights, OH (US)

( * ) Notice: Subject to any disclaimer, the term of this patent is extended or adjusted under 35 U.S.C. 154(b) by 38 days.

(21) Appl. No.: 18/199,684

(22) Filed: May 19, 2023

(65) Prior Publication Data
US 2023/0377392 A1 Nov. 23, 2023

Related U.S. Application Data

(60) Provisional application No. 63/344,515, filed on May 20, 2022.

(51) Int. Cl.
G07C 9/00 (2020.01)
G06F 21/36 (2013.01)

(52) U.S. Cl.
CPC ......... *G07C 9/00182* (2013.01); *G06F 21/36* (2013.01); *G07C 9/0069* (2013.01); *G07C 2009/00253* (2013.01); *G07C 2009/00277* (2013.01)

(58) Field of Classification Search
CPC .............. G07C 9/00182; G07C 9/0069; G07C 2009/00253; G07C 2009/00277; G06F 21/36
USPC .......................................................... 340/5.6
See application file for complete search history.

(56) References Cited

U.S. PATENT DOCUMENTS

| | | |
|---|---|---|
| 5,194,856 A | 3/1993 | Zijlstra |
| 5,600,121 A | 2/1997 | Kahn et al. |
| 5,635,906 A | 6/1997 | Joseph |
| 5,713,485 A | 2/1998 | Liff et al. |
| 5,745,036 A | 4/1998 | Clare |
| 5,887,176 A | 3/1999 | Griffith et al. |
| 6,169,483 B1 | 1/2001 | Ghaffari et al. |
| 6,272,394 B1 | 8/2001 | Lipps |
| 6,338,007 B1 | 1/2002 | Broadfield et al. |
| 6,681,989 B2 | 1/2004 | Bodin |
| 7,150,365 B2 | 12/2006 | Hardy et al. |
| 7,451,881 B2 | 11/2008 | Hardy et al. |
| 7,497,341 B2 | 3/2009 | Hardy et al. |
| 7,513,419 B1 * | 4/2009 | Crews .................. G06Q 20/042 235/379 |

(Continued)

*Primary Examiner* — Omar Casillashernandez
(74) *Attorney, Agent, or Firm* — LOZA & LOZA, LLP; Kevin L. Soules

(57) ABSTRACT

A secure product display system and associated method can include a display secured with a lock, a dispenser including a digital key request code and an input configured to accept entry of a digital key, and an access cloud configured to transmit the digital key to a user device when the digital key is requested using the digital key request code, wherein the lock is unlocked when the digital key, entered with the input, is authentic.

20 Claims, 19 Drawing Sheets

(56) References Cited

U.S. PATENT DOCUMENTS

| | | |
|---|---|---|
| 7,635,068 B2 | 12/2009 | Hardy |
| 8,047,385 B2 | 11/2011 | Hardy |
| 8,120,468 B2 | 2/2012 | Kangas |
| 8,210,363 B2 | 7/2012 | Hardy |
| 8,235,227 B2 | 8/2012 | Hardy |
| 8,413,823 B2 | 4/2013 | Hardy |
| 8,727,179 B2 | 5/2014 | Colelli et al. |
| 8,787,902 B2 * | 7/2014 | Kim .................. H04W 12/068 455/426.1 |
| 9,277,831 B2 | 3/2016 | Hardy |
| 9,526,351 B2 | 12/2016 | Hardy |
| 9,552,710 B2 | 1/2017 | Rasband et al. |
| 9,659,424 B2 | 5/2017 | Huber et al. |
| 9,687,085 B2 | 6/2017 | Hardy |
| 9,706,857 B2 | 7/2017 | Hardy et al. |
| 9,723,934 B2 | 8/2017 | Hardy |
| 9,844,280 B2 | 12/2017 | Dipalo et al. |
| 9,993,091 B2 | 6/2018 | Hardy |
| 10,026,248 B2 | 7/2018 | Woodard et al. |
| 10,051,977 B2 | 8/2018 | Hardy |
| 10,062,257 B2 | 8/2018 | Chau |
| 10,332,117 B2 | 6/2019 | Krause et al. |
| 10,349,755 B2 | 7/2019 | Dipaolo et al. |
| 10,441,092 B2 | 10/2019 | Hardy |
| 10,555,624 B2 | 2/2020 | Hardy |
| 10,667,630 B2 | 6/2020 | Hardy |
| 10,905,258 B2 | 2/2021 | Hardy et al. |
| 10,945,538 B2 | 3/2021 | Hardy |
| 11,051,637 B2 | 7/2021 | Hardy |
| 11,058,234 B2 | 7/2021 | Dipaolo et al. |
| 11,109,692 B2 | 9/2021 | Swafford |
| 11,178,982 B2 | 11/2021 | Hardy |
| 11,182,803 B2 * | 11/2021 | Budano ................ G06K 7/1417 |
| 11,188,973 B2 | 11/2021 | Bynum et al. |
| 11,216,827 B2 † | 1/2022 | Budano |
| 11,344,138 B2 | 5/2022 | Hardy et al. |
| 11,375,826 B2 | 7/2022 | Hardy |
| 11,587,081 B2 * | 2/2023 | Weston ................ G06Q 20/382 |
| 11,599,891 B2 † | 3/2023 | Budano |
| 11,631,089 B2 † | 4/2023 | Budano |
| 11,887,131 B2 | 1/2024 | Budano et al. |
| 11,928,694 B2 | 3/2024 | Budano et al. |
| 2002/0016715 A1 | 2/2002 | Razumov |
| 2004/0079799 A1 * | 4/2004 | Symonds ............. G06Q 30/06 235/381 |
| 2006/0022827 A1 | 2/2006 | Higham |
| 2008/0001747 A1 | 1/2008 | Kangas |
| 2009/0322529 A1 | 12/2009 | Kangas |
| 2010/0187307 A1 | 7/2010 | Phillips et al. |
| 2011/0074543 A1 | 3/2011 | Kaczmarz et al. |
| 2011/0133948 A1 * | 6/2011 | Ervin .................... A61J 7/0409 340/687 |
| 2015/0143123 A1 * | 5/2015 | Bergqvist ............... B67D 7/348 713/171 |
| 2015/0379366 A1 | 12/2015 | Nomura et al. |
| 2016/0260155 A1 * | 9/2016 | Landsman ......... G06Q 30/0631 |
| 2017/0217011 A1 | 8/2017 | Savage et al. |
| 2017/0372555 A1 | 12/2017 | Clark et al. |
| 2018/0374327 A1 | 12/2018 | Enekwa et al. |
| 2021/0395070 A1 * | 12/2021 | Sankaran ........... G05B 19/4155 |
| 2022/0041425 A1 * | 2/2022 | Sankaran ............. G06F 3/0482 |
| 2023/0129525 A1 * | 4/2023 | Lee ...................... A47J 31/521 426/231 |
| 2023/0153831 A1 | 5/2023 | Budano et al. |
| 2024/0042888 A1 * | 2/2024 | Goswami ............. H02J 7/0048 |
| 2024/0104582 A1 | 3/2024 | Budano et al. |

\* cited by examiner
† cited by third party

THEFT DETERRING PRODUCT DISPLAY

CROSS REFERENCE TO RELATED PATENT APPLICATIONS

The present application claims the priority and benefit under 35 U.S.C. § 119(e) of U.S. Provisional Patent Application Ser. No. 63/344,515 filed May 20, 2022, entitled "THEFT DETERRING PRODUCT DISPLAY." U.S. Provisional Patent Application Ser. No. 63/344,515 is herein incorporated by reference in its entirety.

TECHNICAL FIELD

Embodiments are generally related to the field of product displays. Embodiments are related to locking devices. Embodiments are also related to the field of theft deterrence. Embodiments are further related to the field of computer devices and mobile devices used for providing digital keys to open secure product displays. Embodiments are also related to methods, systems, and devices for deterring retail theft with locking displays which can be unlocked with digital keys.

BACKGROUND

A critical aspect of retail sales is the display of merchandise in a manner that allows customers to peruse offerings. In many cases, this involves the time tested practice of holding merchandise on pegs, shelves, or display stands openly accessible to customers. Open access to merchandise allows customers to review products at their leisure, but also comes at a cost, as it leaves the items vulnerable to theft.

Profit loss due to theft is nothing new in retail. In response, retailers use a wide variety of theft deterrent and prevention solutions. Some theft deterrent solutions make the process of stealing so uncomfortable (e.g., slow) that thieves are unwilling to take the risk. A common theft prevention solution involve placing certain items under lock-and-key, making the process of stealing sufficiently inconvenient and conspicuous, that it is not worth the risk.

Small merchandise is particularly attractive to a thief because it is easy to conceal. The value of a small retail item determines which type of security solution makes sense. For example, jewelry is both small and expensive and is therefore usually stored in a theft prevention device such as a locked display cabinet or jewelry safe as illustrated in FIGS. 1A and 1B labeled as prior art.

Other less expensive items, such razors, or batteries, that are still valuable enough to be attractive to a thief are usually secured using a theft deterrent device such as an anti-sweep peg board spiral as shown in FIG. 2 labeled as prior art.

Obviously, it would be possible to reduce theft, regardless of item type, by securing everything in a theft prevention device as illustrated in FIGS. 1 and 2. Unfortunately, placing every item under lock-and-key is expensive. In addition, shoppers don't appreciate the inconvenience associated with finding a store associate to unlock items for them. This leads to lost sales and can discourage the shoppers so much that they elect to shop elsewhere, where making selections does not require a store associate to disarm an anti-theft device.

Prior art solutions, as described above, have various short comings. Locking anything using a physical key and lock is problematic for retailers. Keys frequently get lost or copied and locks get damaged. These problems individually are of little consequence, but collectively demand valuable retailer resources to resolve and maintain. Similarly anti-sweep devices slow down theft, but when theft occurs there is no way to identify the thief.

Furthermore, some prior art solutions include digitally controlled distribution systems. These systems are convenient when they are operational. However, most such systems are reliant on internet of things (IOT) devices, which require an internet connection. It can be expensive and time consuming to maintain internet configurations associated with retail displays. When the retail internet or IOT device is inoperative or unavailable, the digitally controlled distribution system is similarly inoperable.

Accordingly, there is a need in the art for methods and systems that serve to deter theft without deterring legitimate customers from making purchases as detailed in the embodiments herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide improved methods and systems for theft deterrence.

It is another aspect of the disclosed embodiments to provide a method, system, and apparatus for retail theft deterrence.

It is another aspect of the disclosed embodiments to provide methods, systems, and apparatuses for product displays with integrated theft deterrence mechanisms.

It is another aspect of the disclosed embodiments to provide methods, systems, and apparatuses for product displays with integrated theft deterrence mechanisms, which can be opened with digital keys.

In the embodiments herein, a system, method, and apparatus for a theft deterring retail display system including a retail display fitted with an electronic lock. The electronic lock can be unlocked with a digital key. The digital key can be dispensed electronically to a customer when the customer provides customer data. The system can include a validity check to ensure the data provide by the customer is valid and authentic before dispensing the digital key.

For example, in an embodiment, a display system comprises a display secured with a lock, a dispenser, the dispenser comprising: a digital key request code and an input configured to accept entry of a digital key, and an access cloud configured to transmit the digital key to a user device when the digital key is requested using the digital key request code, wherein the lock is unlocked when the digital key, entered with the input, is authentic. In an embodiment, the lock comprises an electronic lock. In an embodiment, the digital key request code comprises a QR code. In an embodiment, the digital key comprises a string of numbers. In an embodiment, the digital key comprises a unique digital key every time the digital key is requested using the digital key request code. In an embodiment, the display comprises a retail product display. In an embodiment, the access cloud further comprises a mobile UI configured to require the user to input their phone number in order to receive the digital key. In an embodiment, the mobile UI provides the digital key to the user after the user enters their phone number. In an embodiment, the access cloud provides the digital key to the user as a text message using the phone number provided by the user.

In another embodiment, a secure display system comprises a display secured with a lock, a digital key request code, an access module configured to transmit a digital key to a user device when a digital key is requested using the digital key request code, and a digital key reader configured to unlock the lock when the digital key is authentic. In an embodiment, the lock comprises an electronic lock. In an embodiment, the display comprises a retail product display. In an embodiment, the digital key request code comprises a QR code. In an embodiment, the digital key request code is provided proximate to the digital key reader. In an embodiment, the access module generates a unique digital key every time the digital key is requested using the digital key request code. In an embodiment, the digital key comprises a QR code. In an embodiment, the digital key reader comprises a camera configured to scan the QR code.

In another embodiment, a secure access method comprises providing a digital key request code on a dispenser, upon receiving a digital key request, requiring entry of a phone number via a web portal, providing a digital key to a user device, accepting input at the dispenser, the input comprising the digital key, authenticating the digital key, and unlocking a lock associated with a display when the digital key is authentic. In an embodiment, providing a digital key to a user device further comprises at least one of: providing the digital key to the user via a mobile UI and/or providing the digital key to the user as a text message using the phone number entered via the web portal. In an embodiment, the digital key comprises at least one of a QR code and/or a string of numbers.

BRIEF DESCRIPTION OF THE FIGURES

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1A:
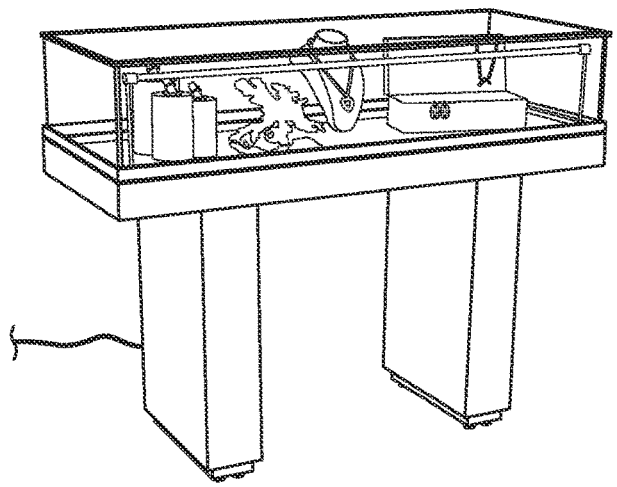
FIG. 1A illustrates prior art theft deterrence means.
Figure 1B:
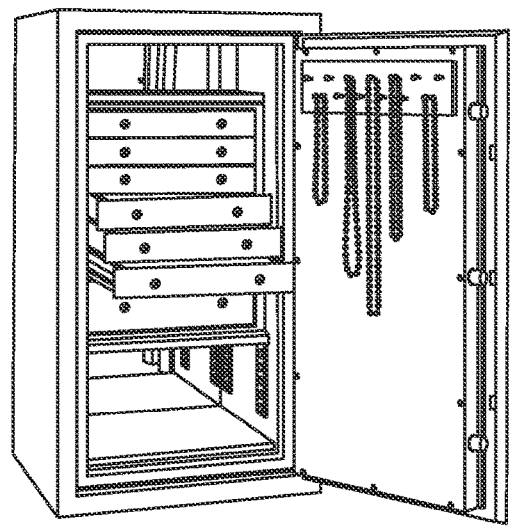
FIG. 1B illustrates prior art theft deterrence means.
Figure 2:
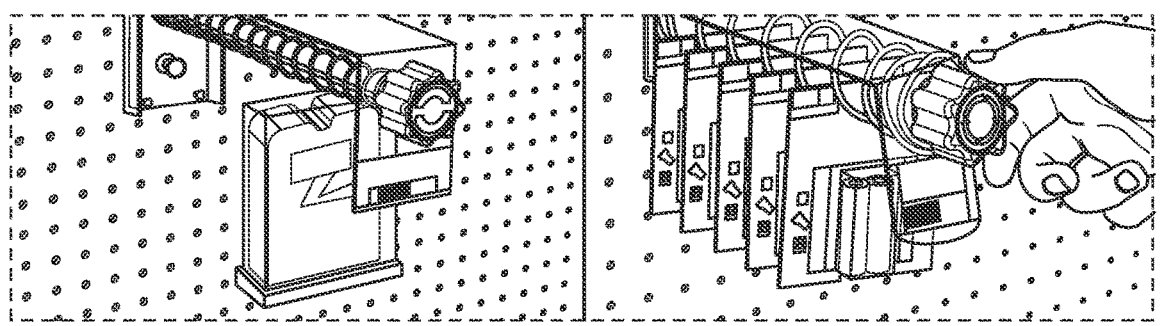
FIG. 2 illustrates prior art theft deterrence means.

The particular values and configurations discussed in the following non-limiting examples can be varied, and are cited merely to illustrate one or more embodiments and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

Figure 3:
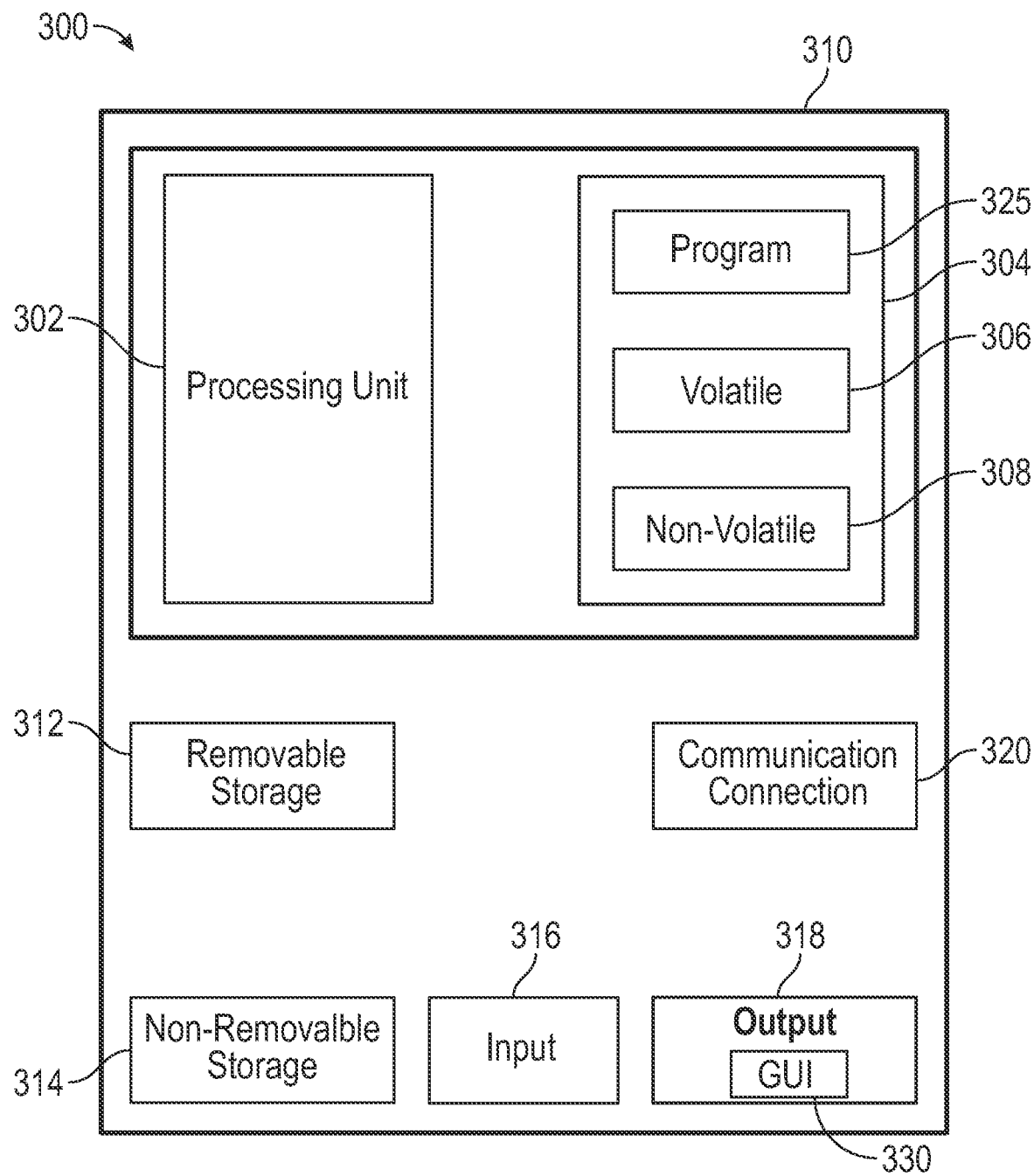
FIG. 3 depicts a block diagram of a computer system which is implemented in accordance with the disclosed embodiments.
Figure 4A:
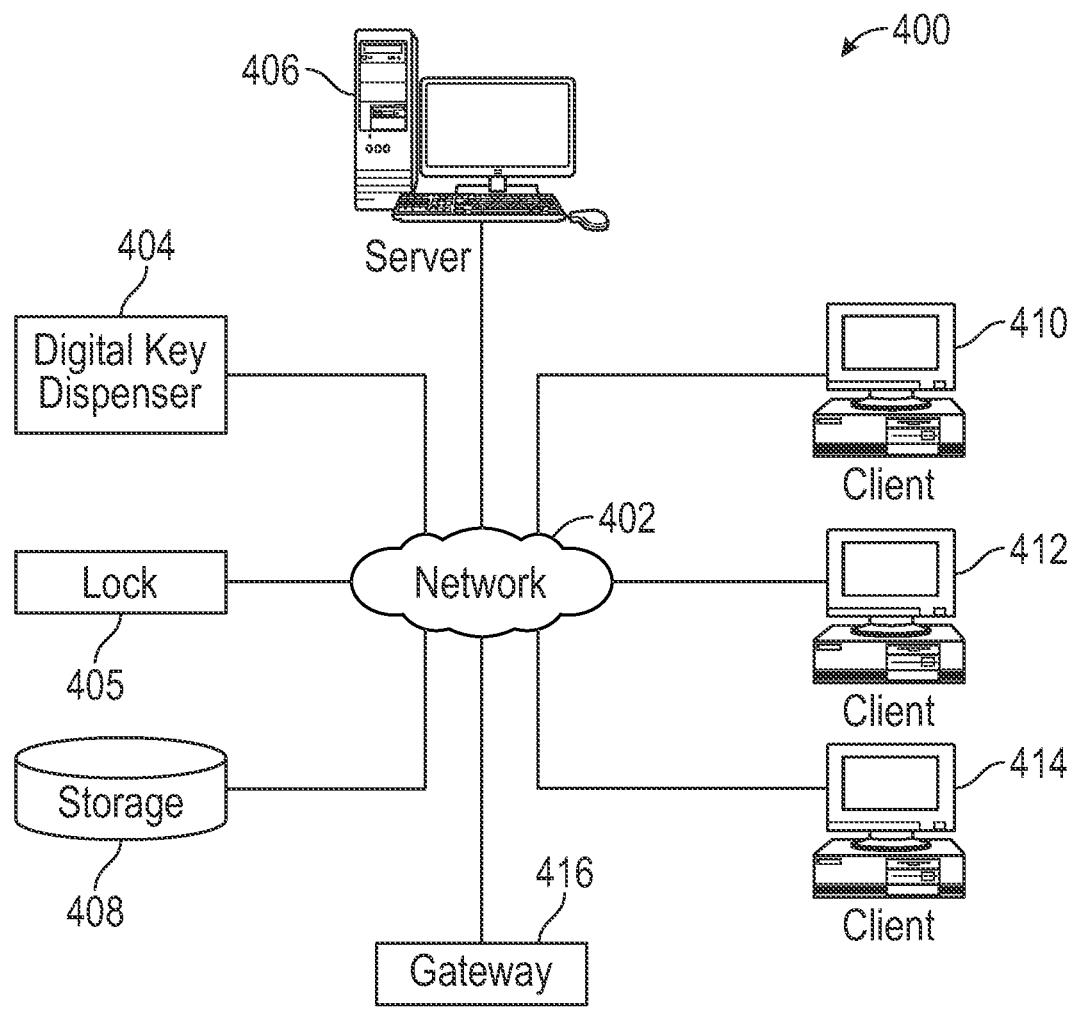
FIG. 4A depicts a graphical representation of a network of data-processing devices in which aspects of the present embodiments may be implemented.
Figure 4B:
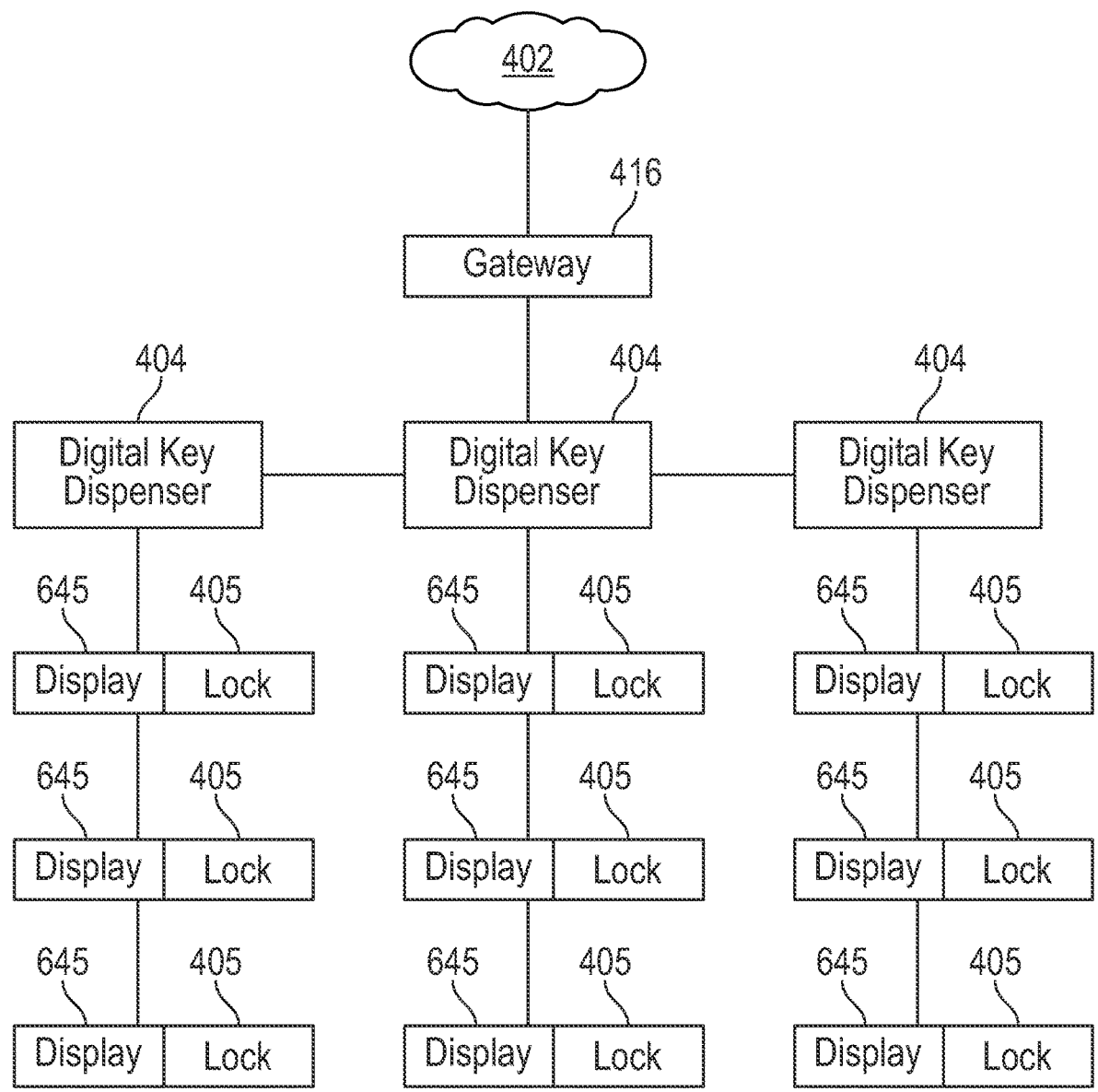
FIG. 4B depicts a graphical representation of a network associated with a digital key dispenser in which aspects of the present embodiments may be implemented.
Figure 5:
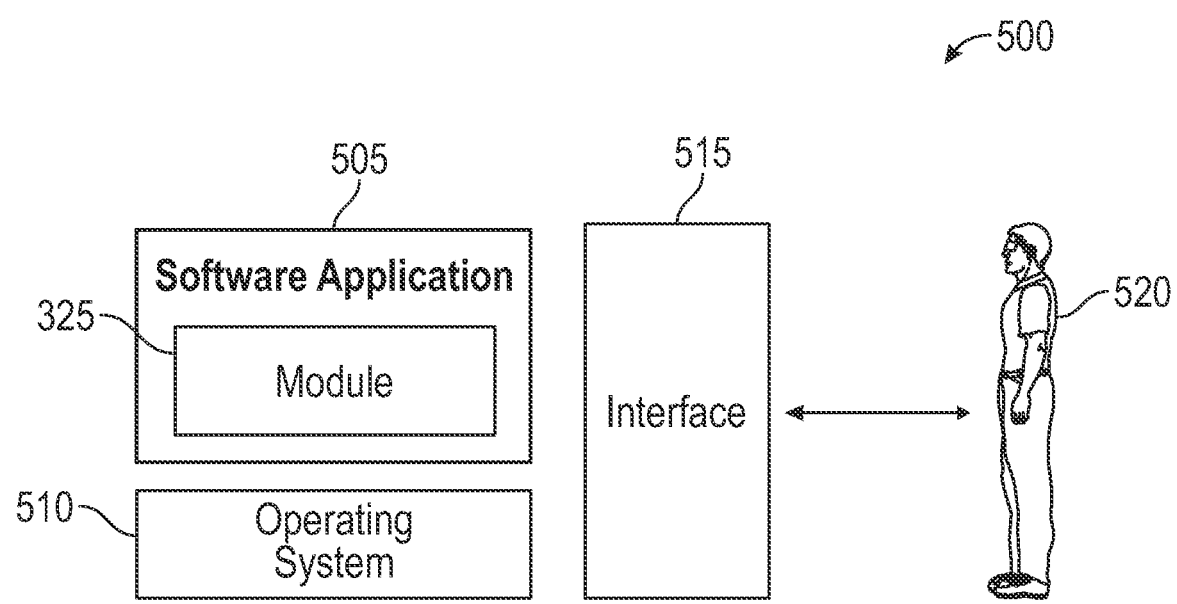
FIG. 5 depicts a computer software system for directing the operation of the data-processing system depicted in FIG. 1, in accordance with an example embodiment.

FIGS. 3-5 are provided as exemplary diagrams of data-processing environments in which embodiments of the present invention may be implemented. It should be appreciated that FIGS. 3-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 300 that executes programming for implementing parts of the methods and systems disclosed herein is shown in FIG. 3. A computing device in the form of a computer 310 configured to interface with sensors, peripheral devices, and other elements disclosed herein may include one or more processing units 302, memory 304, removable storage 312, and non-removable storage 314. Memory 304 may include volatile memory 306 and non-volatile memory 308. Computer 310 may include or have access to a computing environment that includes a variety of transitory and non-transitory computer-readable media such as volatile memory 306 and non-volatile memory 308, removable storage 312 and non-removable storage 314. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 310 may include or have access to a computing environment that includes input 316, output 318, and a communication connection 320. The computer may operate in a networked environment using a communication connection 320 to connect to one or more remote computers, remote sensors, actuators, smart locks, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 4 below.

Output 318 is most commonly provided as a computer monitor, but may include any output device. Output 318 and/or input 316 may include a data collection apparatus associated with computer system 300. In addition, input 316, which commonly includes a computer keyboard and/or pointing device such as a computer mouse, computer track pad, or the like, allows a user to select and instruct computer system 300. A user interface can be provided using output 318 and input 316. Output 318 may function as a display for displaying data and information for a user, and for interactively displaying a graphical user interface (GUI) 330.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 316 such as, for example, a pointing device such as a mouse and/or with a keyboard. A particular item can function in the same manner to the user in all applications because the GUI provides standard software routines (e.g., module 325) to handle these elements and report the user's actions. The GUI can further be used to display the electronic service image frames as discussed below.

Computer-readable instructions, for example, program module or node 325, which can be representative of other modules or nodes described herein, are stored on a computer-readable medium and are executable by the processing unit 302 of computer 310. Program module or node 325 may include a computer application. A hard drive, CD-ROM, RAM, Flash Memory, and a USB drive are just some examples of articles including a computer-readable medium.

FIG. 4A depicts a graphical representation of a network of data-processing systems 400 in which aspects of the present invention may be implemented. Network data-processing system 400 is a network of computers or other such devices such as mobile phones, smartphones, sensors, detection devices, and the like in which embodiments of the present invention may be implemented. Note that the system 400 can be implemented in the context of a software module such as program module 325. The system 400 includes a network 402 in communication with one or more clients 410, 412, and 414, and lock 405. Network 402 may also be in communication with one or more external devices such as digital key dispensers 404, sensors, or locks 405, servers 406, and storage 408. Network 402 is a medium that can be used to provide communications links between various devices and computers connected together within a networked data processing system such as computer system 300. Network 402 may include connections such as wired communication links, wireless communication links of various types, fiber optic cables, quantum, or quantum encryption, or quantum teleportation networks, etc. It should be understood that external device 404 may be embodied as a lock, electronic lock, mobile device, cell phone, tablet device, monitoring device, detector device, sensor, microcontroller, controller, receiver, transceiver, or other such device.

In the depicted example, external device 404, server 406, and clients 410, 412, and 414 connect to network 402 along with storage unit 408. Clients 410, 412, and 414 may be, for example, personal computers or network computers, handheld devices, mobile devices, tablet devices, smartphones, personal digital assistants, microcontrollers, recording devices, MFDs, etc. Computer system 300 depicted in FIG. 3 can be, for example, a client such as client 410 and/or 412.

Computer system 300 can also be implemented as a server such as server 406, depending upon design considerations. In the depicted example, server 406 provides data such as boot files, operating system images, applications, and application updates to clients 410, 412, and/or 414. Clients 410, 412, and 414 and external device 404 are clients to server 406 in this example. Network data-processing system 400 may include additional servers, clients, and other devices not shown. Specifically, clients may connect to any member of a network of servers, which provide equivalent content.

In the depicted example, network data-processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 400 may also be implemented as a number of different types of networks such as, for example, an intranet, a local area network (LAN), or a wide area network (WAN). FIGS. 3 and 4 are intended as examples and not as architectural limitations for different embodiments of the present invention.

FIG. 5 illustrates a software system 500, which may be employed for directing the operation of the data-processing systems such as computer system 300 depicted in FIG. 3. Software application 505, may be stored in memory 304, on removable storage 312, or on non-removable storage 314 shown in FIG. 3, and generally includes and/or is associated with a kernel or operating system 510 and a shell or interface 515. One or more application programs, such as module(s) or node(s) 325, may be "loaded" (i.e., transferred from removable storage 314 into the memory 304) for execution by the data-processing system 500. The data-processing system 500 can receive user commands and data through user interface 515, which can include input 316 and output 318, accessible by a user 520. These inputs may then be acted upon by the computer system 500 in accordance with instructions from operating system 510 and/or software application 505 and any software module(s) 325 thereof.

Generally, program modules (e.g., module 325) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module), and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 515 (e.g., a graphical user interface 330) can serve to display results, whereupon a user 520 may supply additional inputs or terminate a particular session. In some embodiments, operating system 510 and GUI 330 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 510 and interface 515. The software application 505 can include, for example, module(s) 525, which can include instructions for carrying out steps or logical operations such as those shown and described herein.

The following description is presented with respect to embodiments of the present invention, which can be embodied in the context of, or require the use of a data-processing system such as computer system 300, in conjunction with program module 325, and data-processing system 400 and network 402 depicted in FIGS. 3-5. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

In the embodiments herein, a system, method, and apparatus comprise a display system configured to deter theft. It should be appreciated that the display disclosed herein can comprise a retail display. However, in other embodiments, the display can comprise a display configured for other purposes. The embodiments include a blend of a theft deterrent and theft protection solutions. The embodiments keeps items locked up but allow shoppers access to the key without the direct assistance of a retail associate. In some cases, the embodiments are configured to operate without the use of a retail internet connection, requiring only that the customer have an internet connected device (e.g., a smart phone). It is advantageous to reduce the burden of maintaining internet connected retail devices.

Figure 6:
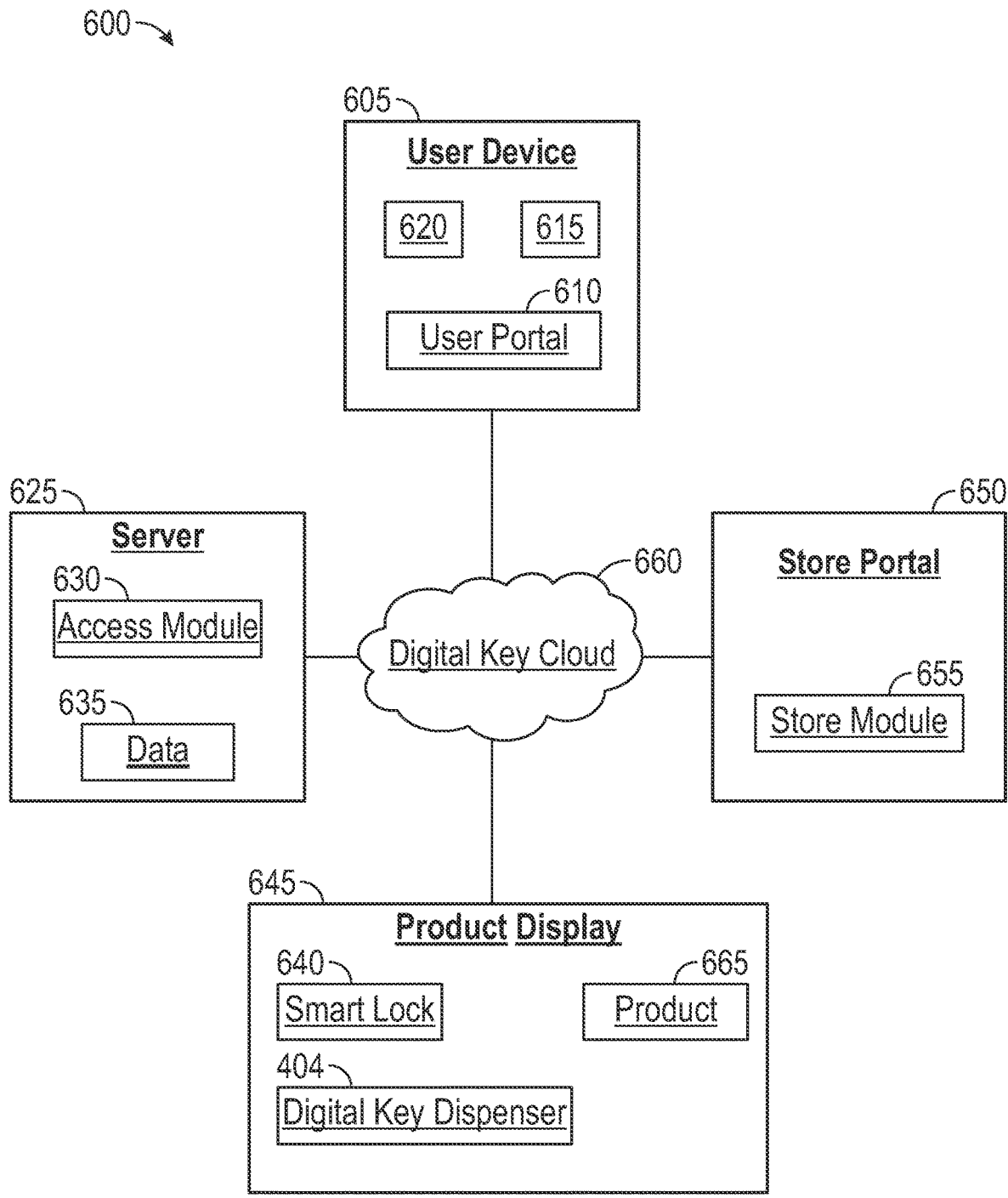
FIG. 6 depicts a block diagram of a display security system, in accordance with the disclosed embodiments.

FIG. 6 illustrates a block diagram of a display system 600 for displaying products with integrated theft deterrence in accordance with the disclosed embodiments. The system can generally include a mobile device, or user device 605 that provides a user portal 610. The user portal 610 can serve as the interface through which the customer interacts with the system 600.

As illustrated in FIG. 6, the user device 605 can be any device that is equipped with a camera 615 or other such interface where a code can be entered, and internet connection. In certain embodiments, the user device 605 can be configured to read QR codes or near field communication (NFC) and can have a GPS receiver 620, such that the user device 605 can verify information from a QR code or NFC, and can verify position and time. In certain embodiments, the user device 605 can comprise a mobile device, or smart phone, a tablet device, a computer, a smart watch, a smart wearable device, or other such device.

The user device 605 can be equipped with a user portal 610. In certain cases, the user portal 610 can comprise a standalone software module (e.g., an app). In other embodiments, the user portal 610 can be a web portal served to a webpage operated on the user device 605. The user portal 610 can serve as an interface through which the user interacts with the product display system 600. The interface can comprise a specially designed graphical user interface that allows the user to receive alerts relating to the display system. It should be understood that in certain embodiments, the display system can interact with the user device via SMS messaging, via an internet browsing application provided on the device, or other such digital protocols only. This can be achieved in a number of ways as further detailed herein.

The user device 605 can interact with other aspects of the system through a wired or wireless connection via the world wide web, a Bluetooth connection, a near field connection, or the like. In certain embodiments, this can be achieved using a cloud computing architecture. In certain embodiments, a server 625 can provide data 635 storage and can provide an access module 630. Data storage 635 can include structured data storage for all the data collected herein, as further detailed below. The data storage can be accessed from the gateway 416, store portal 650, or both according to the associated system architecture for a given installation.

The display system 600 further includes a security device 640. The security device 640 can be an electronic locking mechanism, including but not limited to a smart lock or other such electronic lock. The security device 640 can be configured to lock a product display 645. The display can serve as a product display embodied as a cabinet, enclosed shelf, locked peg, or other such product display. The security device 640 can interact with the system 600 to allow access to the product display 645 and products 665 therein.

Figure 12:
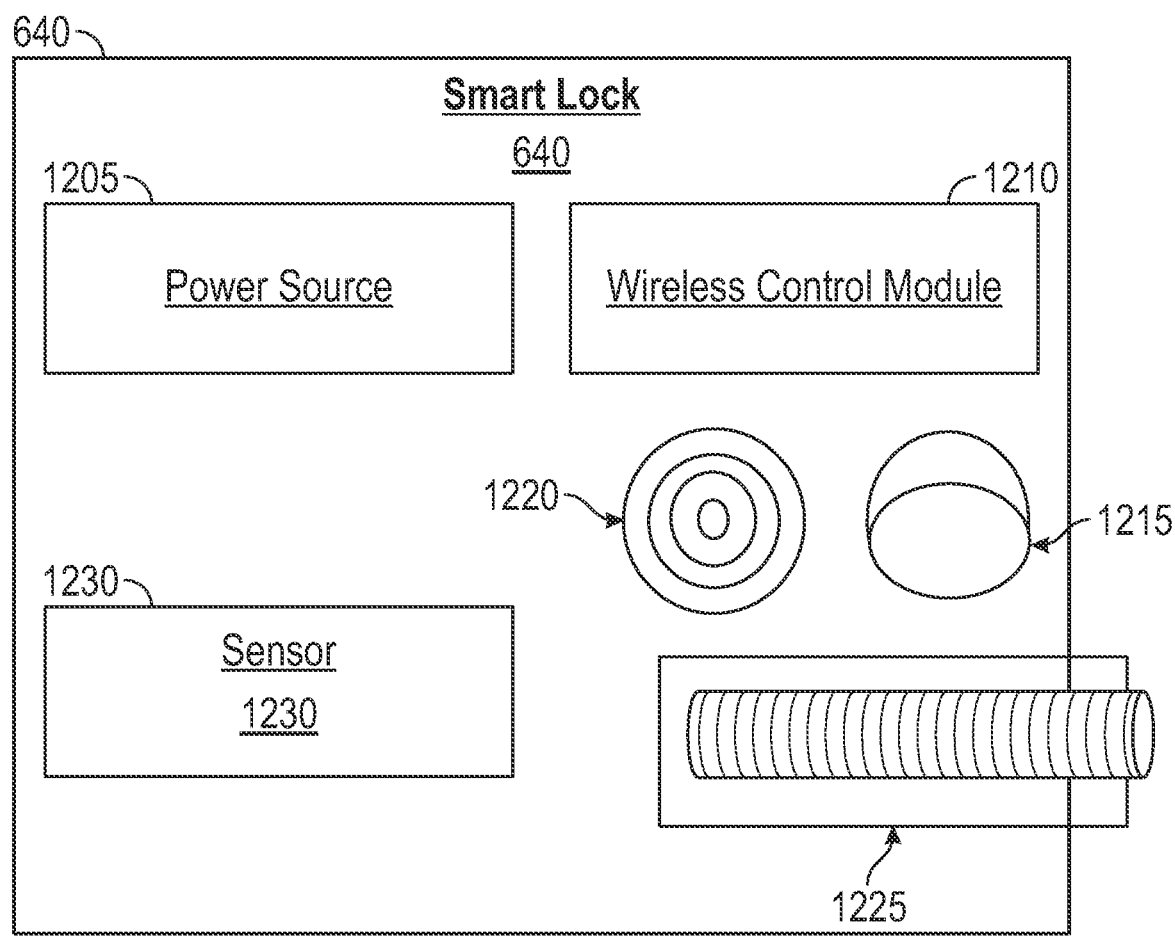
FIG. 12 depicts a block diagram of a smart lock, in accordance with the disclosed embodiments.

FIG. 12 depicts aspects of the security device 640 embodied as a smart lock. The smart lock can include a power source 1205 which can preferably be a battery, although a wired power connection is also possible. Likewise, the smart lock 640 can include a wireless control module 1210, eliminating the need for control wiring between key dispenser and the lock. The smart lock can further be optionally configured with a light 1215, loudspeaker 1220, and/or a spring biased release 1225 so that when the lock disengages, it does so in a manner that makes it obvious the associated door is unlocked; for example, a light will flash, a sound will play, and/or the door will pop open). The smart lock 640 can further include a sensor 1230 so that when a shopper walks away, the smart lock 640 can identify their departure and can check that the door is in the "closed" position. The smart lock 640 and actively latch and lock itself (i.e., it will automatically lock itself and not require a shopper to close and lock it properly). If the smart lock determines it is not properly latched and locked it can provide a visible, audible, and/or wireless notification for store associates.

In certain embodiments, numerous security devices 640 and/or product displays 645 can be distributed throughout a retail environment. In certain aspects, numerous systems architectures are possible using the embodiments disclosed herein. For example, FIG. 4B illustrates that in certain embodiments, a gateway 416 can be used to provide the access module 630 via a website or other such internet accessible node. In such embodiments, one digital key dispenser 404 can be associated with one or more product displays 645 and associated locks 405 (or smart locks 640). Numerous digital key dispensers 404 can be distributed in the retail environment as illustrated. Of note, the customer is able to access the gateway 416 and digital key dispenser via their own internet connected user device.

The display system 600 can further include a store portal or other such monitoring station 650, which can comprise a computer system (as illustrated in FIGS. 3-5) wherein a retail store manager or administrator can control aspects of the disclosed system 600. An interface associated with store module 655, can comprise a specially designed graphical user interface that allows the administrator to set and receive alerts relating to scheduling, monitor the display, send messages to a user, unlock security devices 640 for restocking or other purposes, and set other system parameters. It should be understood that the store portal 650 can comprise multiple devices accessible by multiple administrators in certain embodiments. In certain embodiments, the store portal 650 can comprise any device with a browser (or app) used by authorized personnel to administer the overall system. Tasks such as managing the blocked list, approved list, generating usage reports, configuration notifications, and monitoring the overall system can be provided and completed via the store portal 650.

The access module 630 can comprise the root application (or software) that is used to control the system. The server 625 can serve data to, and accept data from, the user device 605, the smart lock 640, and the store module 655. In other embodiments, cloud storage 660 can be used to store some or all of the relevant data and/or software associated with the system 600.

Figure 7:
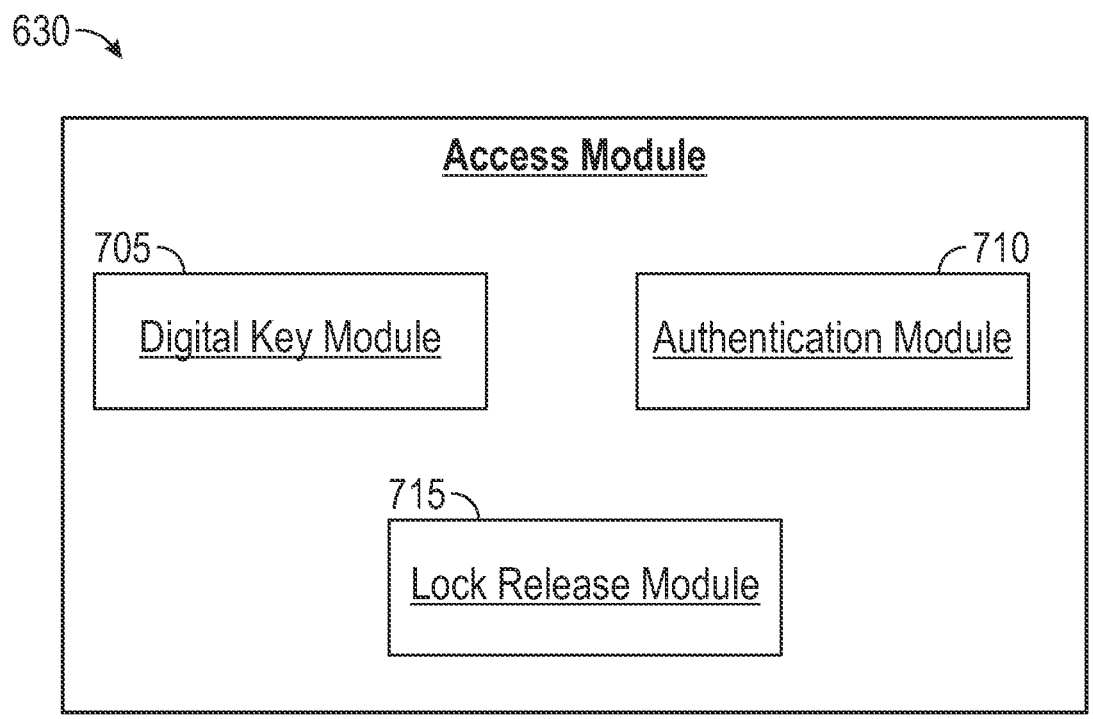
FIG. 7 depicts an access module, in accordance with the disclosed embodiments.

FIG. 7 illustrates a system diagram of the access module 630. The access module 630 can include a digital key module 705, authentication module 710, and lock release module 715 and can serve as an API for accessing data stored in database 625.

In an exemplary embodiment, the digital key module 705 can control the distribution of digital keys to customers. The system 600 can include a digital key dispenser 404 as illustrated in FIG. 8. The digital key dispenser can be disposed on a product display 645, or in another location proximate to the product display 645. The digital key dispenser can include a digital key request code 805. In certain embodiments, this can be embodied as a QR code but in other embodiments other such codes can be used. In certain embodiments, the digital key request code 805 can be uniquely associated with the product display 645 to which it is attached, since a retail sales environment may include multiple secure product displays 645 throughout the retail space. Note the digital key request code 805 need not be a digital rendering. In certain embodiments, the digital key request code 805 can be printed on or near the associated display.

Figure 8A:
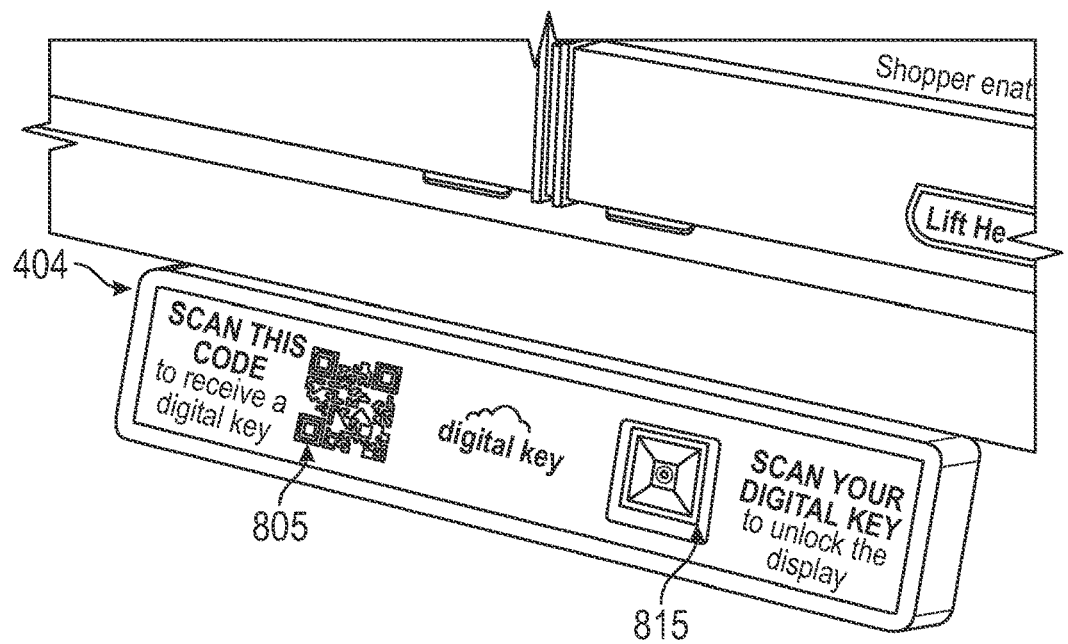
FIG. 8A depicts a digital key dispenser, in accordance with disclosed embodiments.
Figure 8B:
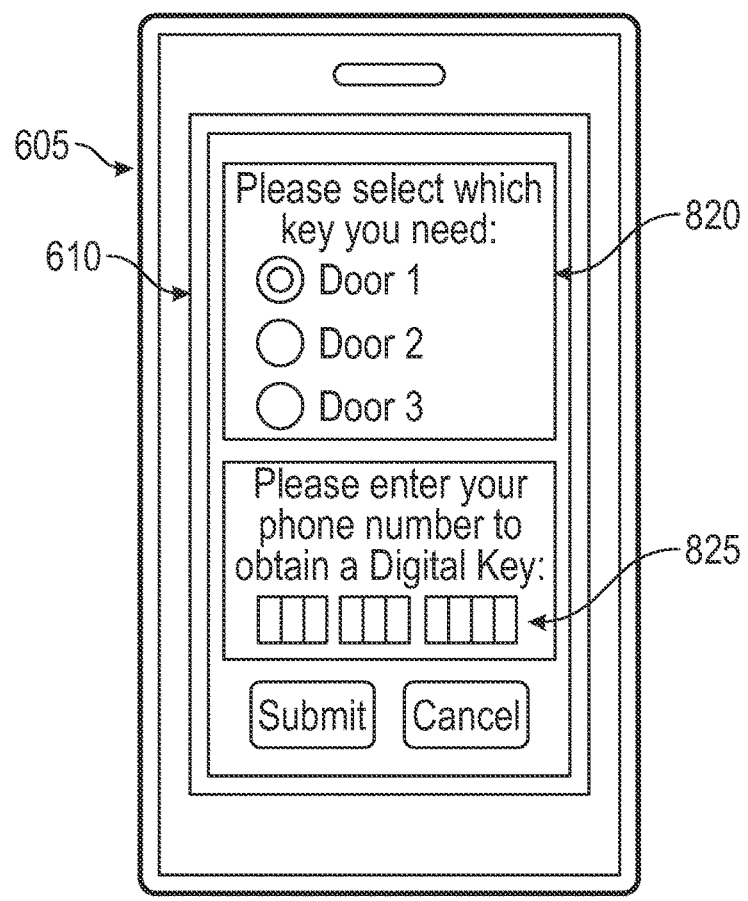
FIG. 8B depicts a home screen of a user interface of a user portal displayed on a user device, in accordance with the disclosed embodiments.

The digital key request code 805 can be scanned or otherwise entered at a user device 605. The digital key request code 805 can initiate an instances of a web browser which can automatically open on the user device 605. FIG. 8B illustrates aspects of a user portal 610, which can comprise a web application, or other such software. In certain embodiments, the user portal 610 can also be provided as a downloadable application (app), although the use of an app is not required. The user portal 610 can be used to first prompt 820 the user to identify the door which needs to be unlocked so that the user can access a retail item inside.

In addition, the user portal 610 can require the user to provide an identity verification 825 which can be a phone number and, in certain cases other biographical or identifying data. In certain embodiments, this can include an email address, physical address, photograph, information on a driver's license, etc. The identifying information 825 required can be selected by the administrator. In certain embodiments, the detail required in the identifying information 825 may be related to the level of security for the retail item in the product display 645.

Figure 8C:
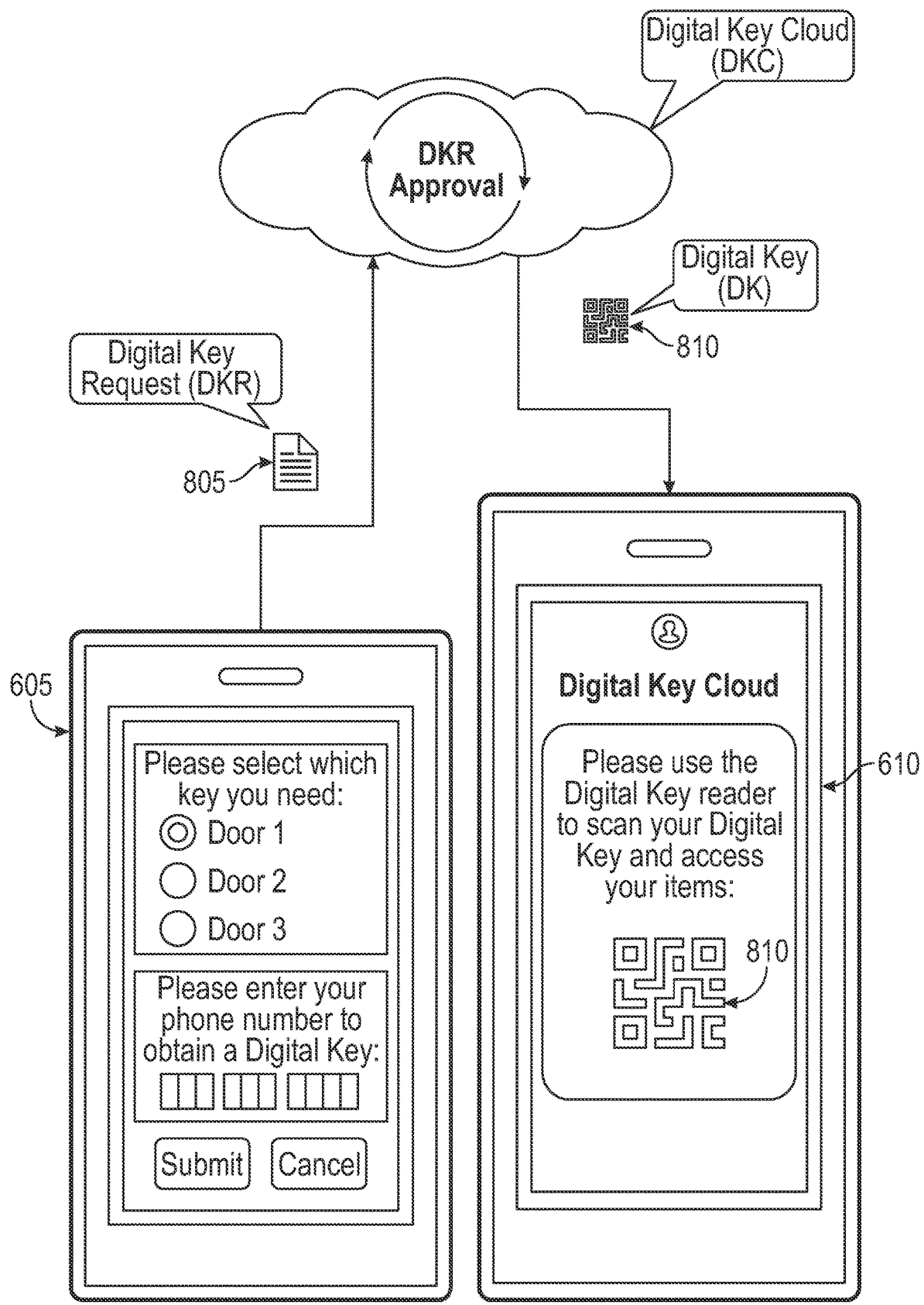
FIG. 8C depicts a block diagram of a digital key dispensation method, in accordance with the disclosed embodiments.

However, in certain embodiments, the system 600 is meant to serve as a theft deterrent that does not significantly inconvenience the customer. As such, the customer phone number may be the only identifying information required. When the user provides the identifying data, it can be stored as data 635. Once the data is entered, the digital key module 705 can generate a unique digital key 810 which can be displayed via the user portal 610. This process is illustrated in FIG. 8C.

The access module 630 can likewise provide the digital key 810, or other such authenticating data, matched to the unique digital key served to the user portal 610, to the authentication module 710.

The digital key dispenser 404 can further include a digital key reader 815. The digital key reader 815 can comprise a camera, or other such key input. For example, in other embodiment, the digital key reader 815 can comprise an input where a user can manually enter aspects of the digital key 810. When the digital key 810 is embodied as a QR code in the user portal 610, the QR code can be held in the view of the digital key reader 815 camera. The digital key reader 815 can provide the digital key 810 to the authentication module 710. The digital key stored in data 635 can then be used to authenticate the digital key provided via the user module 610.

Figure 8D:
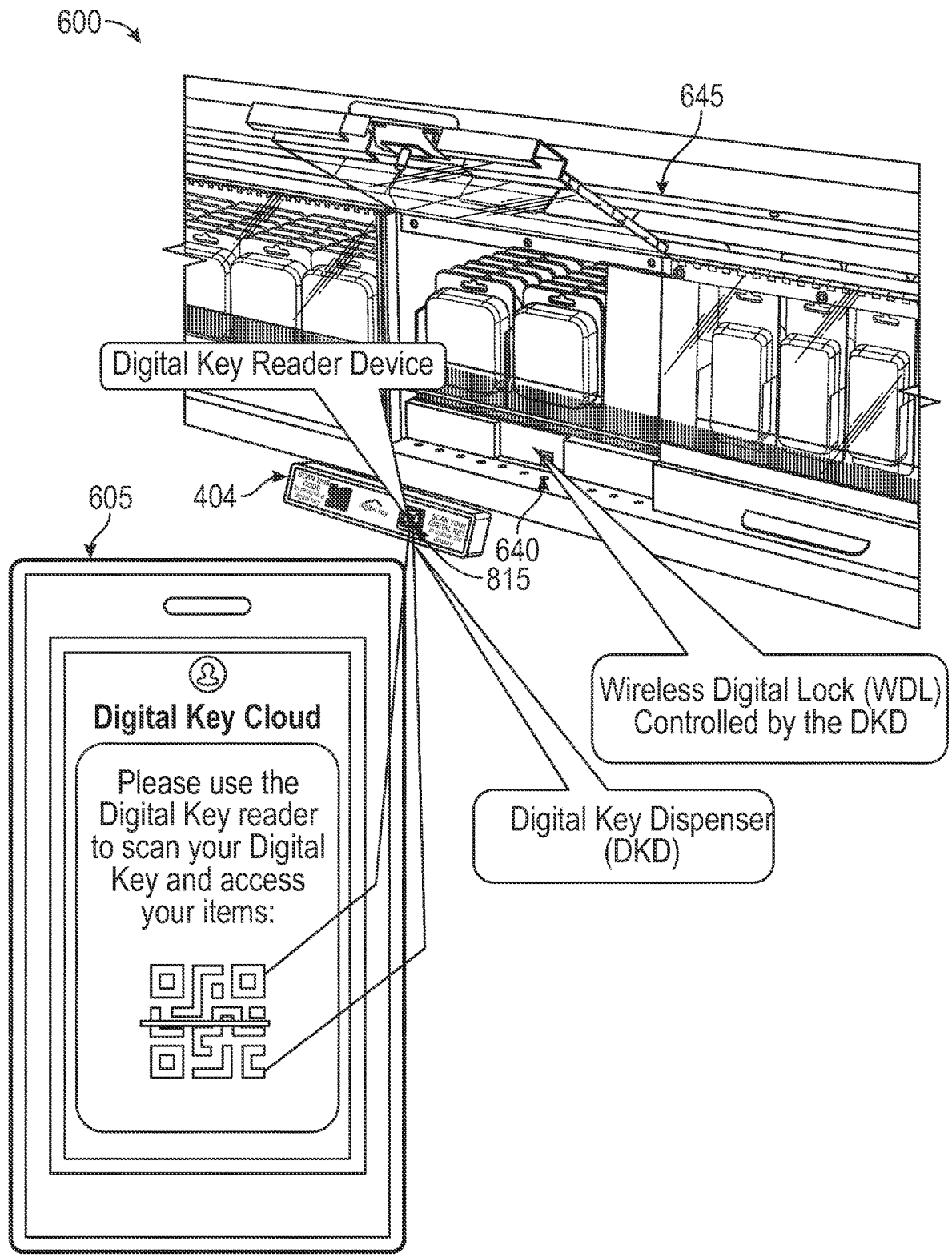
FIG. 8D depicts a retail display with an associated digital key dispenser, in accordance with the disclosed embodiments.

If the digital key 810 is authenticated, the lock release module can send a signal to the smart lock 640 in order to unlock the product display 645 as illustrated in FIG. 8D. If the digital key is not authenticated, the display can remain locked, and the user can be prompted to request a valid digital key via a display or loudspeaker configured on the digital key dispenser 404.

It should be appreciated that the digital key request code and/or the digital key can take many forms. In the embodiment description above a QR code is used for both. However, other digital formats also apply. For example, using NFC technology a shopper could tap their mobile device on the Digital Key Request Code device and then tap their mobile device on the Digital Key Reader device once they receive a Digital Key.

Figure 9:
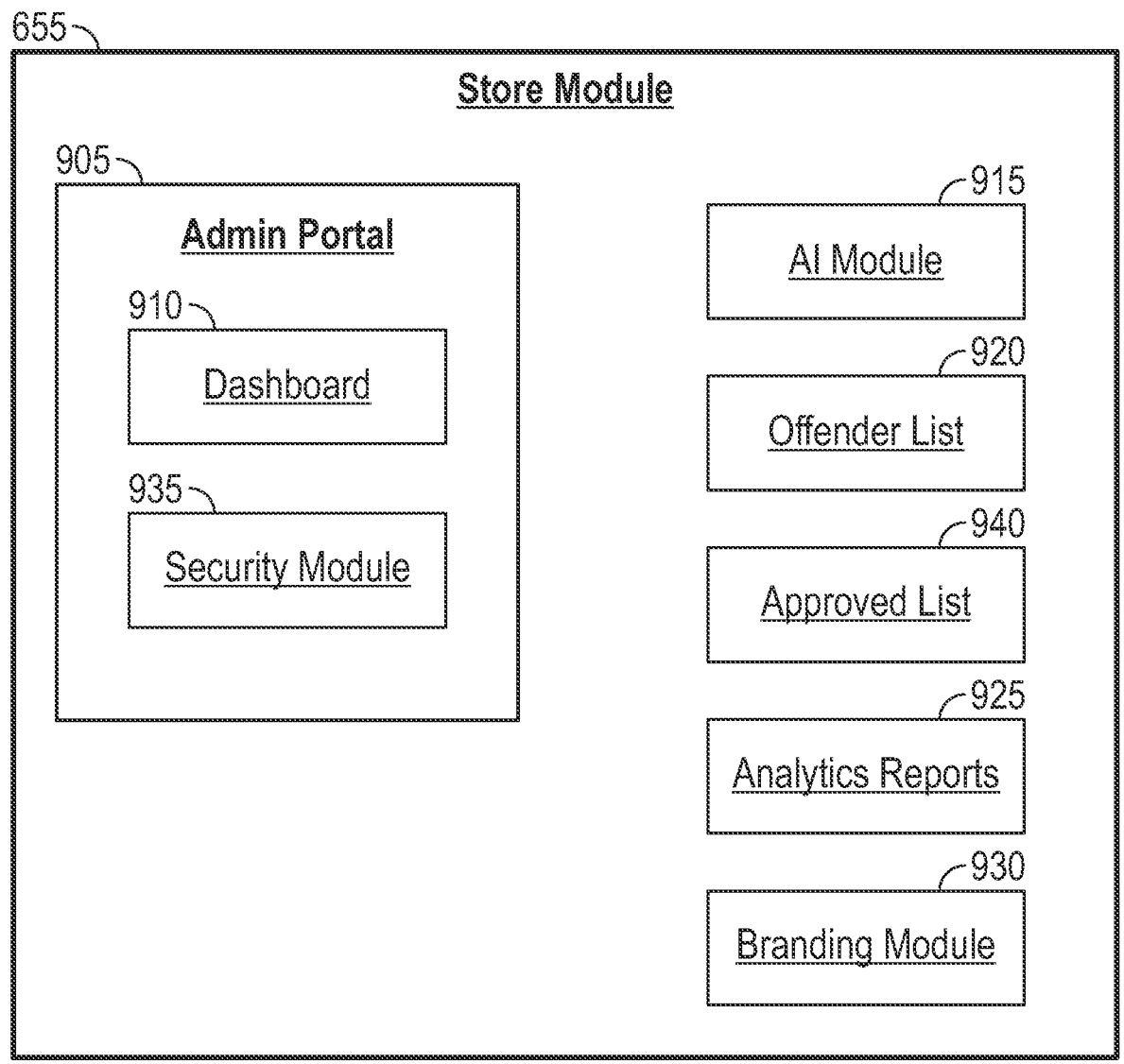
FIG. 9 depicts a block diagram of a store module, in accordance with the disclosed embodiments.

The system 600 is configured for more than providing digital keys to shoppers. Each store portal 650 can be managed by a store manager, or other trusted associate (this person, or people, can be collectively referred to as an administrator). The store module 655 can be configured to allow the administrator to login into an admin portal 905 associated with their unique account as illustrated in FIG. 9. The admin portal 905 provides many capabilities.

For example, the store module can include a dashboard 910 summarizing the health of all the digital key reader devices (e.g., fixtures) associated with the store module 655.

In certain embodiment, tunable artificial intelligence module 915 can automatically detects nefarious shopper behavior associated with a specific mobile device 605 and can automatically add the device to a blocked list 920. Those on the blocked list 920 using device 605 and/or associated phone numbers can be denied new digital keys. The blocked list 920 can be edited using the admin portal 905. Likewise, an approved list 940 can be provided. Those on the approved list can include store personnel or trustworthy customers who open the display often. Those on the approved list will not be flagged for frequent use, or unusual behavior associated with the display.

The admin portal 905 can be used to access a wide variety of usage reports 925 (i.e., shopper analytics). These can include specific analytics 925 relating to total purchases from a given display, time of purchase, demographics associated with the purchaser, and other such data.

In certain embodiments, a branding module 930 allows the admin to brand messages, such as text message sent to the shopper containing the digital key. Likewise, the branding module can be used to provide coupon codes or other purchasing incentives with the digital key message.

In certain embodiments, a security module 935 associated with the store module can be used to provide notifications based on various user defined criteria. For example, one aspect of the security module 935 is to automatically transmit a notification such as a text message for events including but not limited to: new blocked list devices, attempts to obtain a digital key using a blocked listed device, a door left open for too long, removal of a large quantity of products with one digital key, and the like.

Figure 10:
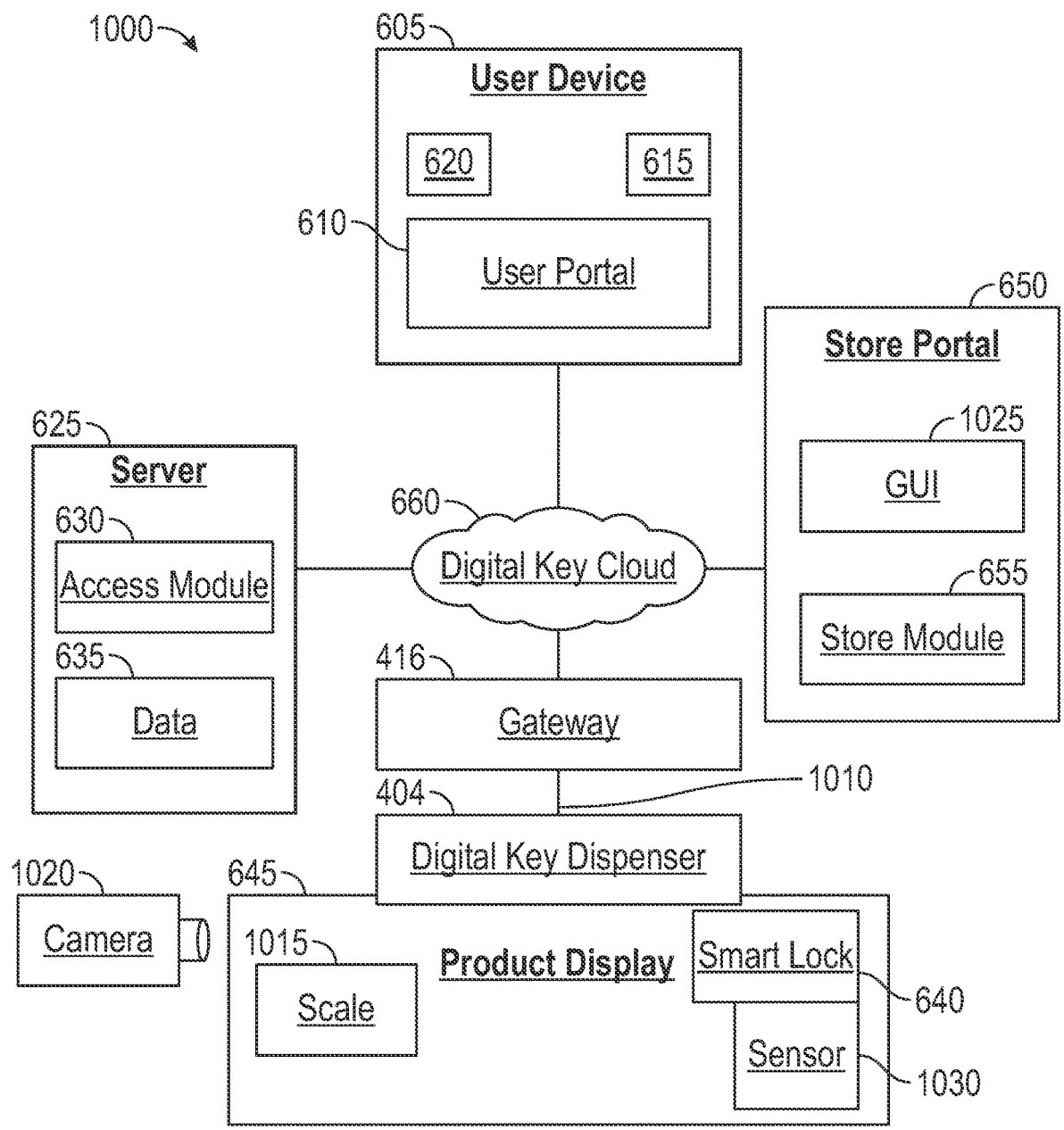
FIG. 10 depicts a block diagram of another display security system, in accordance with the disclosed embodiments.
Figure 11:
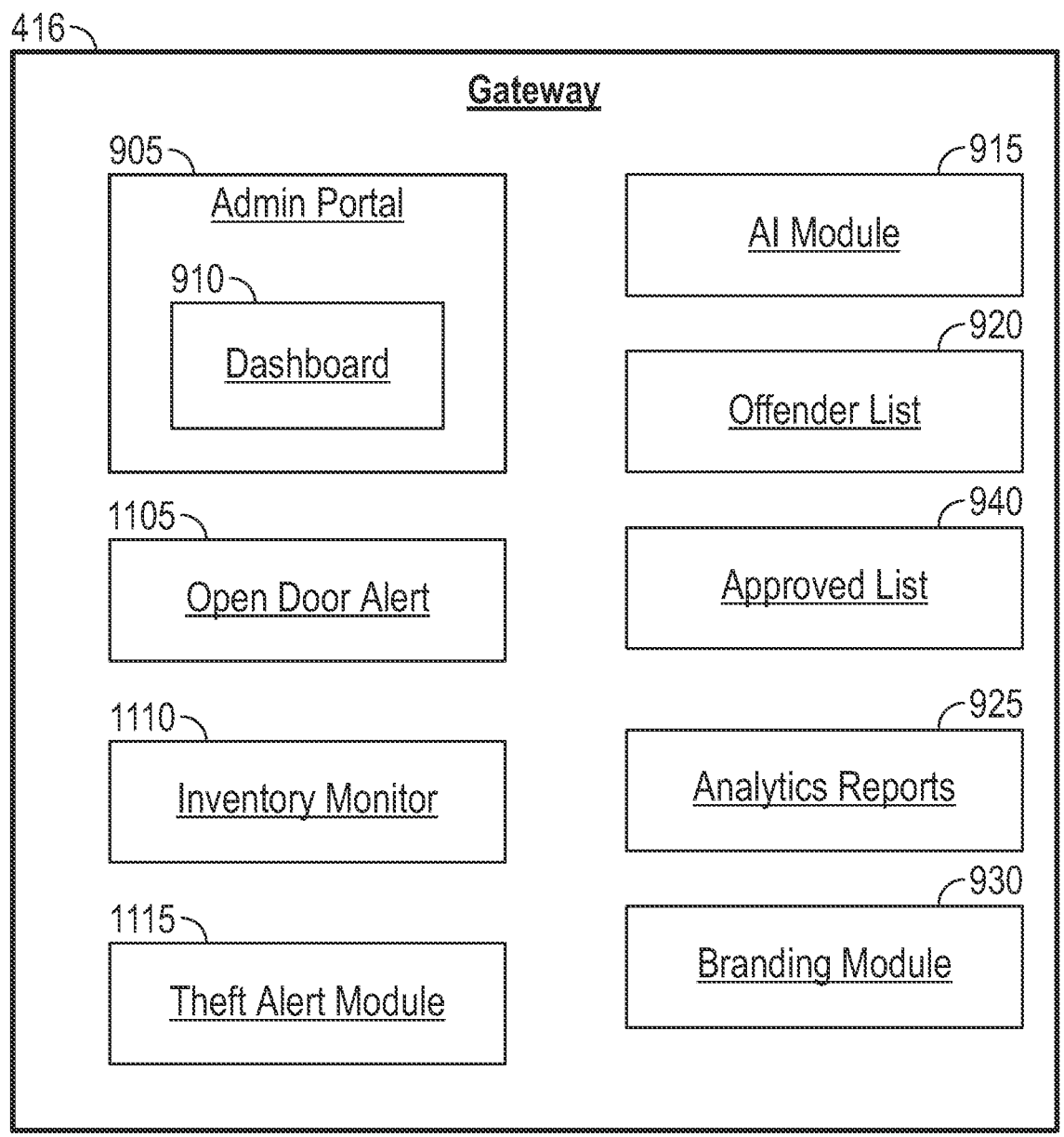
FIG. 11 depicts a block diagram of a gateway, in accordance with the disclosed embodiments.

Aspects of another embodiment of a retail display security system 1000 are illustrated in FIG. 10. It should be appreciated that some or all of the features disclosed in FIGS. 1-8 may be incorporated in the retail display security system 1000.

The retail display security system 1000 can further include a digital key gateway 416. The digital key gateway 416 can be connected to all digital key dispensers 404 in a store using a long range, private wireless network 1010 as illustrated in FIG. 4B. It can also optionally be connected to the internet. The digital key gateway 416 enhances the system security.

First, the digital key gateway 416 can include serve information to a monitoring console associated with graphical user interface 1025 that is accessible by store associates and can provide information. The information can include a door sensor 1030 signal indicating a fixture door has been left open with an open door alert 1105. Camera or video data from camera 1020 can be used for this purpose as well. The door alert can also include a timer to collect information such as the amount of time the fixture door remained open each time it was unlocked.

The digital key gateway 416 can further monitor stocking levels in the product display 645 with a scale 1015 integrated in the display and/or via camera 1020. When the stocking levels become low, an inventory monitor 1110 can send an alert that the display needs re-stocking. The digital key gateway 416 can also monitor battery life, and can notify a store admin when a new battery is required.

The digital key gateway 416 can also be used to detect potential nefarious shopper behavior such as removal of numerous products when the door is open, with a theft alert module 1115. For example, the scale 1015 can be calibrated with the weight of a given product. If more than one product is removed while the door is open, the associated weight will be incorrect, and a notification can be provided to the admin. In certain embodiments, where a shopper may wish to purchase two of a product, a prompt can be provided in the user portal requiring the user to indicate the number of product they will remove.

Likewise, location data, sensor data, and temporal data collected from a user device enable the AI module 915 to detect potential nefarious usage patterns associated with activity within a specific radius from a given location.

Various advantages can be realized using the systems and methods disclosed herein. As noted, users may not need to install an app on their mobile device. The embodiments takes advantage of native mobile device apps such as a web browser. The digital key dispenser can communicate with the smart lock wirelessly. Aspects of the embodiments, including the digital key dispenser and the door lock can be powered by batteries to reduce installation cost, complexity, and maintenance. No hard wiring required, although in certain embodiments, some or all of the systems can be connected to AC power.

Likewise, the digital key dispenser and the wireless door lock do not require an internet connection of any kind. The access module 630 is accessed using the shopper's mobile device internet connection.

Figure 13:
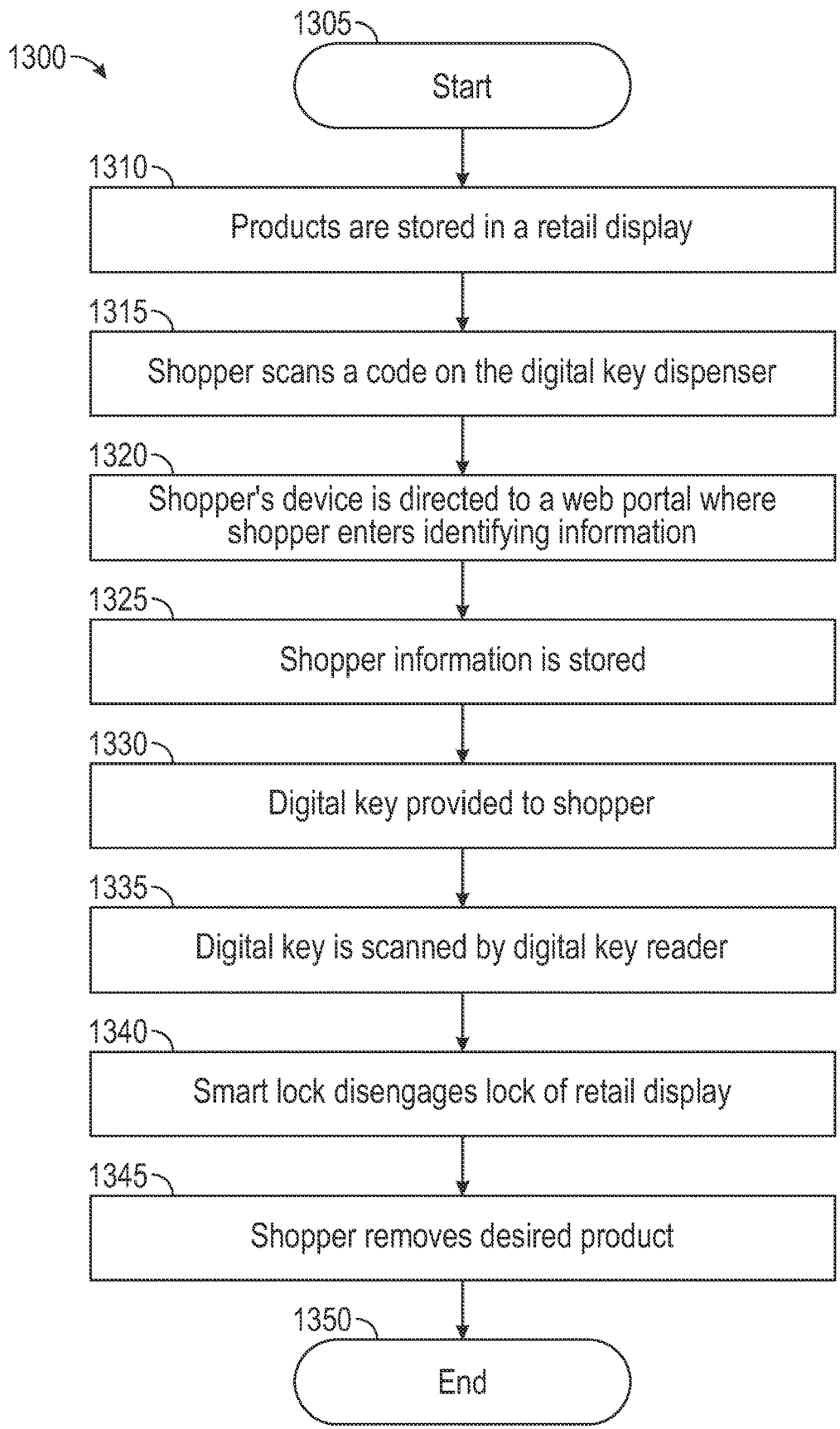
FIG. 13 depicts steps associated with a method for deterring theft, in accordance with the disclosed embodiments.

FIG. 13 illustrates steps associated with a method 1300 for theft deterrence in accordance with the disclosed embodiments. The method begins at step 1305.

At step 1310 products can be displayed in a retail store display which can be locked with a smart lock. When a shopper wishes to purchase an item in the display, at step 1315, the shopper can scan or otherwise enter a code provided on a digital key dispenser with an internet connected device. At step 1320 the code directs the device to a web page where the shopper can enter identity confirming information such as the shopper's name, phone number, address, and/or email address. The shopper may also be prompted to select the door they wish to unlock.

At step 1325, the shopper information can be stored. Next at step 1330 a single use digital key can be provided to the shopper on the device. The shopper can scan the single use key with a digital key reader associated with the digital key dispenser at step 1335. If the key is a valid key, the smart lock associated with the retail store display can be disengaged at step 1340 so that the shopper can remove the desired product at step 1345. The method ends 1350.

Figure 14:
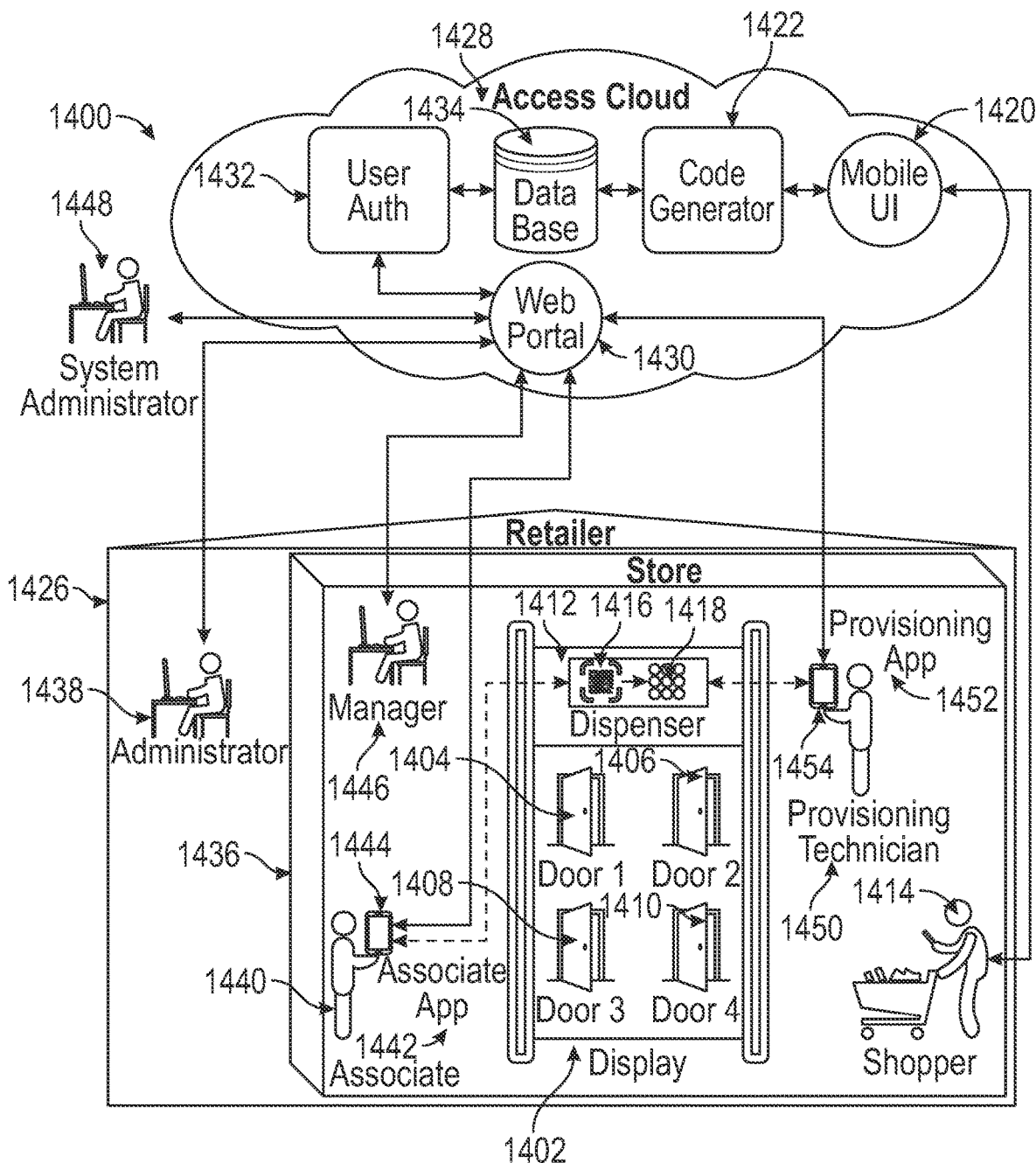
FIG. 14 depicts another product access system, in accordance with the disclosed embodiments.

FIG. 14 illustrates another embodiment of a product access system 1400 in accordance with the disclosed embodiments. Aspects of the product access system may include some or all of the features disclosed in other embodiments illustrated herein. The product access system 1400 generally includes a display 1402 which can comprise a product display and/or a retail product display. In certain embodiments, the display 1402 can include one or more doors fitted with locks, which provide access to products therein. In FIG. 14 four doors are illustrated first door 1404, second door 1406, third door 1408, and fourth door 1410, but in other embodiments a different number of doors can be used. The doors are locked, so that the products stored in the display are not readily accessible.

The display 1402 can include a dispenser 1412, configured to allow a shopper 1414 to access products in the display 1402. The dispenser 1412 can comprise a printed code 1416 displayed on the dispenser or a digitally rendered code displayed in a display window on the dispenser. In certain embodiments, the printed code 1416 can comprise a QR code, bar code, string of characters, or other such code. The dispenser 1412 further includes a keypad 1418.

In order to access the products in the display 1402, the shopper can scan the printed code 1416, for example, by using a camera on their phone to capture the code. Scanning the printed code 1416 automatically launches a Mobile UI 1420 on the mobile device the shopper 1414 used to scan the code. From the mobile UI 1420 the shopper 1414 can specify the door on the display they want to open. The shopper 1414 is then prompted via the mobile UI 1420 displayed on the shopper's phone to enter the shopper's phone number. Once the shopper enters their phone number, the code generator 1422 in the access cloud 1428 can provide a code to the shopper 1414 via the mobile UI 1420 and/or as a "text message" via the SMS protocol at the phone number entered by the shopper 1414. The shopper 1414 can then enter the code using the keypad 1418 on the dispenser 1412. In certain embodiments, the code comprises a digital key code (e.g., a string of numbers). If the shopper 1414 enters the correct code and the code is authentic, one of the doors will unlock, allowing the shopper 1414 to remove product from the display 1402. If the door is left open an alarm can be triggered to alert personnel that the door needs to be closed and locked. If the door is not left open the lock on the door is reengaged automatically. In certain embodiments, the lock can include an optical sensor as further detailed herein.

The system can include an access cloud 1428, which can include a web portal 1430 that serves as the access point for non-shopper actors associated with the system. The web portal 1430 is operably connected to a user authentication module 1432, which can be further connected to a storage structure or database 1434, as well as the code generator 1422 and mobile UI 1420. This architecture is exemplary and can organized in other ways in other embodiments.

The disclosed embodiments can be used by a retailer 1426 and one or more specific stores 1436 operated by the retailer 1426. The retailer 1426 can assign an administrator 1438. Any one of the stores 1436 is managed by a store manager 1446 and may be operated by one or more store associates 1440. The administrator 1438 and the store manager 1446 can access the web portal 1430 via desktop computers, laptop computers, tablet computers, mobile devices or the like. The store associates 1440 can access the web portal 1430 by an associate application 1442 available on an associate mobile device 1444.

Administrators 1438 can be given full read-write access to all the stores 1436 in the retail chain 1426. The administrator 1438 can control manager 1446 and associate 1440 access to the access cloud 1428 and can perform any tasks those users can.

Managers 1446 can control associate 1440 access to the access cloud 1428 and can perform any tasks an associate 1440 can. Managers 1446 can monitor the health of all the fixtures (e.g., displays 1402) in their store(s) 1436, track who restocked each fixture and when, and track shopper activity.

The system 1400 is designed to dramatically reduce or eliminate associate 1440 assistance for shoppers 1414 to access products secured in the display 1402. However, shelves in the display 1402 still need to be re-stocked. Similarly, shoppers 1414 without a cell phone, or those uncomfortable with technology, may require assistance to unlock a display 1402. Associates 1440 perform these tasks using the associate app 1442. Associates 1440 may also be given limited access to the web portal 1430.

Aspects of the system 1400 can be monitored by a system administrator 1448. The system administrator 1448 can work for an independent third party. They are typically members of a compliance team. The system administrator 1448 can access the web portal 1430 and, after authentication with the authentication module 1432, will have full read-write access to the entire access cloud 1428, and control user access to the system 1400.

The third party may also provide one or more provisioning technicians 1450. The provisioning technicians 1450 can use a provisioning application 1452 on the provisioning technician's mobile device 1454 to access the web portal 1430 and the dispenser 1412. The provisioning application 1452 allows the provisioning technician 1450 to provision the dispenser 1412. The provisioning application 1452 can pair dispensers 1412 with doors on the display 1402. The provisioning application 1452 can also be used for troubleshooting, and testing dispenser 1412 hardware. This provisioning application 1452 can be designed to authenticate the provisioning technician 1450 with the user authentication module 1432 without being part of a retailer organization 1426.

The provisioning application 1452 can be configured to be operated by third party personnel, such as the provisioning technician 1450 or the system administrator 1448. The provisioning application 1452 allows users to connect to dispensers 1412 wirelessly, and perform various maintenance and configuration tasks.

Users that open the provisioning application 1452 can initially be presented with a login screen. All users are authenticated by the Cloud 1428 with the user authentication module 1432. Users can reset their password from the login screen. This can be initiated by the Cloud 1428 sending an email to the user with a reset link.

The following description illustrates exemplary uses of the provisioning application 1452. After authentication, a user of the provisioning application 1452 can pair the app 1452 with a dispenser 1412 by entering pairing mode on the dispenser 1412, scanning for dispenser BLE advertisements, and selecting the desired dispenser 1412 (realizing there may be multiple dispensers dispersed in a store 1436. The list of dispensers can be sorted in descending received signal strength indicator "RSSI" order (i.e., strongest RSSI at the top).

The dispenser 1412 enters pairing mode for 30 seconds after power is applied. While in pairing mode, the MAC address is displayed on the dispenser screen as a QR code. In other embodiments, the dispenser 1412 can enter pairing mode in other ways. For example, while holding the "CLR" key down on the keypad 1418, the user can press and hold the "1" key. An LED will blink red (e.g., for 5 seconds). Next, the "1" key is released followed by the "CLR" key.

In certain embodiments, all dispensers 1412 in a store 1436 can advertise their BLE name in the following format: "DISP-XXXXXXXXXXXX". where the 12 "Xs" represent the BLE MAC address of the dispenser (without colons separating the 6 octets).

The user can then bind/link doors with dispensers 1412. Two methods can be used for this step. The first is by scanning the BLE MAC address barcode/QR code label on the door lock with a mobile phone camera. The other is by selecting the door lock from a sorted lock list constructed by scanning for advertisements. The list can be sorted in descending RSSI order (i.e., strongest RSSI at the top). It should be appreciated that, in certain embodiments, all door locks continuously advertise their name when not connected to dispenser 1412. They can use a name format is as follows: "LOCK-XXXXXXXXXXXX", where the 12 "Xs" represent the BLE MAC address of the lock (without colons separating the 6 octets).

The provisioning application 1452 can also provide identifying characteristics for all dispensers 1412 and associated doors in the store 1436. This information can include BLE MAC address, device name, battery level percentage, firmware revision, hardware revision, retailer ID, store ID, and the like.

Using the provisioning application 1452, users can also read and write (if writable) all of the characteristics defined in the BLE custom service for both the dispenser 1412 and associated door (and locks). Once a dispenser 1412 is successfully paired, the user can save the dispenser configuration in the provisioning application 1452 for reuse. Dispenser configurations saved in the app can be downloadable to other dispensers 1412.

The provisioning application can also be used for testing and maintenance. For example, users can open any door associated with any dispenser 1412 that has been instantiated in the provisioning application 1452. In this case, the application 1452 can communicate with the door (or lock) directly. Users can open all doors associated with a specific dispenser 1412 with a single tap.

Likewise, users can update the dispenser 1412 and/or door (lock) firmware over-the-air. The provision application can facilitate this function with access a cloud storage location containing firmware files that allow the user to select a specific file.

The following description illustrates exemplary uses of the associate application 1442. The associate application 1442 is primarily intended for use by managers 1446 and associates 1440. However, administrators 1438 may also be trusted users of the associate application 1442, provided they have an active account.

There are three primary uses functions for the associate application 1442. Before any such functions can be realized or actions can be performed, associate application 1442 users must first be authenticated. Users of the associate application 1442 are first presented with a login screen. All users are authenticated by the cloud 1428 and user authentication module 1432 before the associate application 1442 can be accessed. This ensures the user is only granted access to the objects appropriate for their role(s).

Associate application 1442 users can be assigned one or more roles. Users can reset their password from the login screen. This is achieved by the Cloud sending an email to the user with a reset link.

At the associate application 1442 home screen a user is able to see all the displays 1402 they have been granted access to in the store 1436. The store number, display name, and status of each display 1402 can be made immediately visible. The user can filter and sort by display names. The display 1402 status can be maintained by the cloud 1428 and, in an exemplary embodiment can have three states: 1) Ok (green); 2) Service Soon (yellow); and 3) Immediate Attention (red).

In addition, associate application 1442 can display the app version and username. The user can access their Cloud profile to change their password as necessary and, if the user has been given permission to perform one or more maintenance tasks, they are able to access the maintenance screen (s) from the home screen of the associate application 1442.

In an exemplary embodiment, the associate application 1442 can be used by the associate 1440 to provide shopper assistance. For this use case, the users can open doors on the display 1402 for shoppers with no more than 2 taps (after they have logged in). The user can scan the QR code 1416 on the dispenser 1412 E-Ink screen, from within the app, and will immediately be able to select a door to open.

In another embodiment, the associate application 1442 can be used for restocking. While similar to the shopper assistance use case, it is different because when a door is opened for restocking the "door left open" alarm is disabled. When restocking is complete, and the door is closed it automatically re-enables the "door left open" alarm.

In another embodiment, the associate application 1442 can be used for maintenance. In this case, the user can add displays 1402 to the stores 1436. Users may access only the stores 1436 their account is associated with. Users can similarly add a display 1402 to a store 1436 by giving it a descriptive name. The user is able to bind/link dispensers 1412 to displays 1402. This is accomplished by scanning the MAC address displayed on the screen while in pairing mode. The user can also bind doors to dispensers 1412 by scanning the MAC address sticker on the bottom of the door lock.

In yet another embodiment, the associate application 1442 can be used for troubleshooting problems. The associate application 1442 can provide information related to a display 1402 such as battery level of individual dispensers 1412 and doors. The battery level can be indicated with indicators such as: 1) Ok (>80%); 2) Replace soon (>25% and <80%); 3) Replace immediately (<25%). The associate application 1442 can also be sued for configuring low level settings and updating firmware.

The web portal 1430 can be embodied as a hardware or software module, or as a web application as detailed herein. Likewise, the access cloud 1428 can be understood to be a computer architecture with remote or "cloud" storage, used to implement hardware or software applications as detailed herein. The primary responsibility of the access cloud 1428 is to generate and deliver unlock codes to shoppers 1414 via the code generator 1422. The cloud 1428 can host a web site referred to as the web portal 1430. Once logged into the web portal 1430, users can perform tasks based on varying levels of permission.

Figure 15:
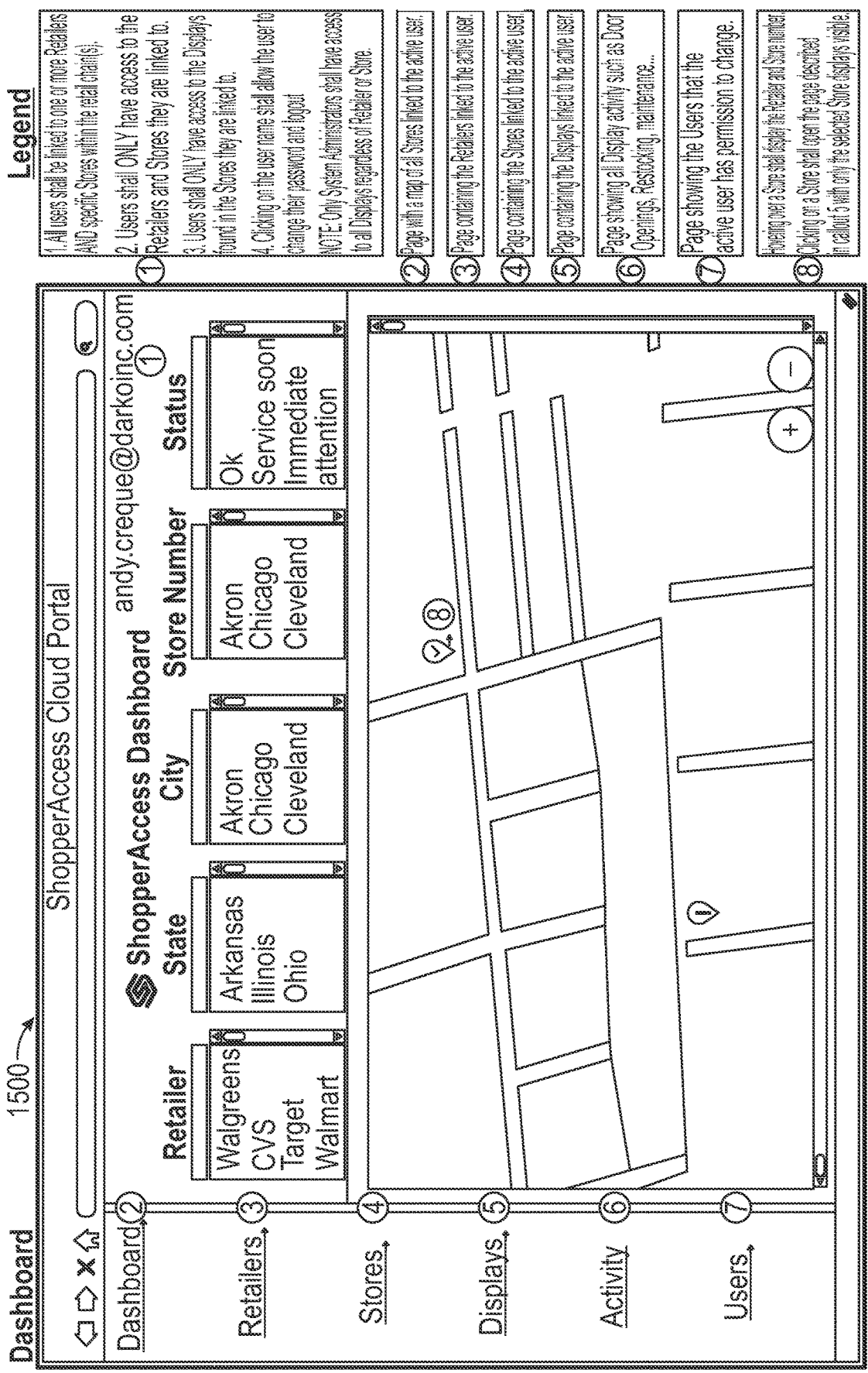
FIG. 15 depicts an exemplary screen shot of a web portal home page associated with a product access system, in accordance with the disclosed embodiments.

FIG. 15 illustrates an exemplary screenshot of a home screen 1500 associated with the web portal 1430.

Figure 16:
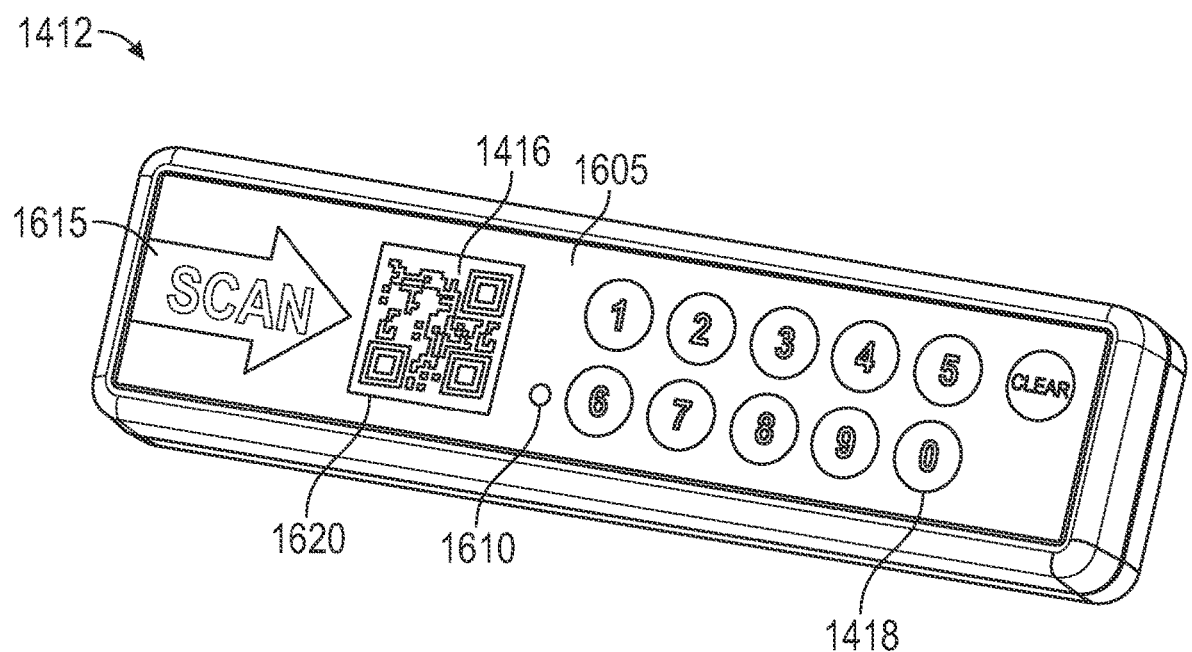
FIG. 16 depicts aspects of a dispenser associated with a product access system, in accordance with the disclosed embodiments.

FIG. 16 illustrates aspects of the dispenser 1412, in accordance with the disclosed embodiments. The dispenser 1412 includes a housing 1605, configured to hold a processing PCB and battery not shown. The dispenser is battery powered so that it can operate without WIFI or power in areas of a store 1436 where power and/or WIFI are not readily available (sometimes referred to as a "dark aisle"). The system 1400 is configured to operate at very low power consumption so that it can operate long term without new batteries.

The electronics are operably connected to a display 1620 for displaying a code 1416. In certain embodiments, the display can be an electronic display that generates a unique code 1416 after the dispenser 1412 is commissioned. In other embodiments, the code can be generated externally and physically affixed to the dispenser 1412 (e.g., as a sticker). A prompt 1615 can be provided adjacent to the display 1620 prompting users to scan the code 1416 in order to open the display. The housing can further include an LED indicator light 1610, which can light up in multiple colors and/or in various patterns to signify operational status. The dispenser 1412 further includes a keypad 1418 for code entry.

An important aspect of the systems (i.e., system 1400) disclosed herein, is that the shopper 1414 can remain anonymous. The system 1400 can be configured to collect the shopper 1414 identification only as a phone number which is then hashed, or as a mac address. Thus, while the system serves to deter shoplifting, it also protects the shopper's 1414 privacy since shopper data need not be collected. In certain embodiments, these safeguards can meet Protected Personal Information (PPI) and General Data Protection Regulation (GDPR) requirements.

Another important advantage of the disclosed systems is that they can be easily integrated into existing third party devices or applications. For example, the dispenser can be commissioned on or near any display system which can be locked. The dispenser can be operably connected to the locking mechanism via blue tooth NFC or other such technology and then used, along with the associated software and hardware systems to control access to the third party display.

Figure 17:
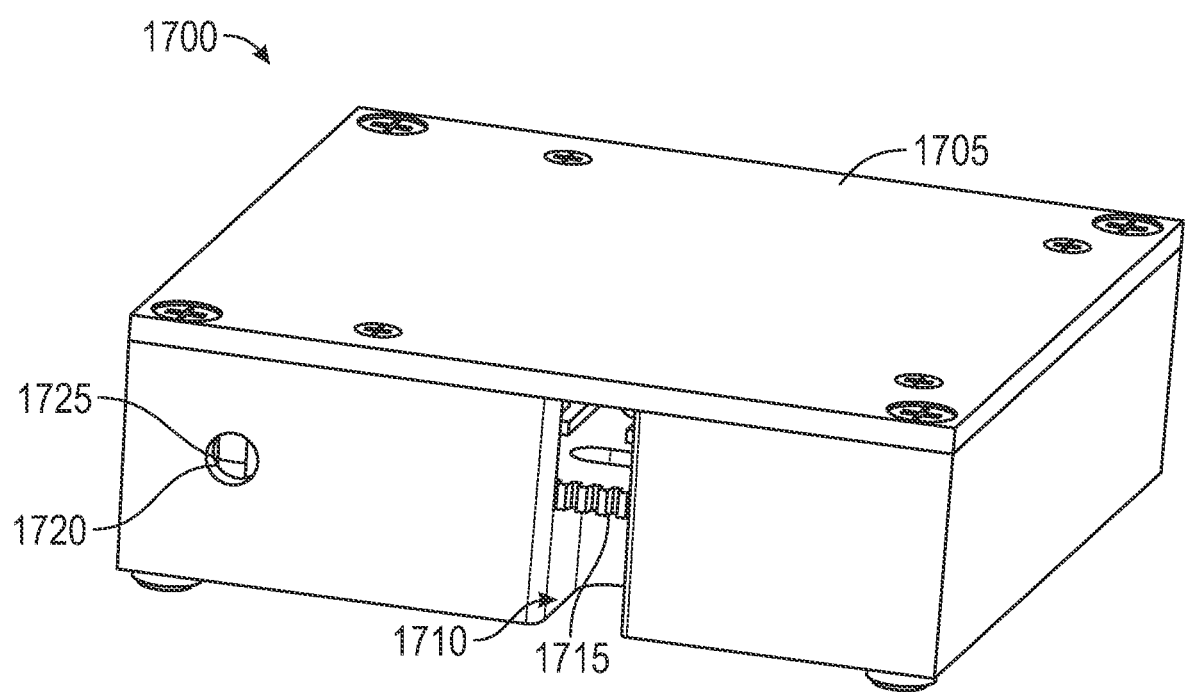
FIG. 17 depicts an exemplary lock associated with a product access system, in accordance with the disclosed embodiments.

Another aspect of the disclosed systems can include locking one or more doors of the display 1402 with a lock that uses optical sensor detection. FIG. 17 illustrates aspects of an exemplary locking system 1700. The locking system 1700 generally comprises a housing 1705 with a locking slot 1710. A rotating locking pawl 1715. The actuator (not shown) for the locking pawl 1715, can be operably connected to an optical sensor 1720 configured in an aperture 1725 in the housing 1705. In operation, the optical sensor 1720 is configured to actuate the locking pawl 1715 when an optical input is interrupted (e.g., when the door to the display blocks the path of an optical signal to the optical sensor. In certain embodiments, the optical sensor can therefore be aligned in the optical path of, for example, a low power laser or other such optic. The optical path is arranged such that the door interrupts the optical path when it is closed. When the optical sensor is no longer receiving the optical input the lock 1700 will lock. When the door is not interfering with the optical path, the lock will remain unlocked.

It should be understood that, in other embodiments, the lock 1700 can work in the opposite way. In other words, the door can unlock when the optical sensor stops receiving an input, and can lock when the optical input is once again incident on the sensor.

Based on the foregoing, it can be appreciated that a number of embodiments, preferred and alternative, are disclosed herein. For example, in an embodiment, a display system comprises a display secured with a lock, a dispenser, the dispenser comprising: a digital key request code and an input configured to accept entry of a digital key, and an access cloud configured to transmit the digital key to a user device when the digital key is requested using the digital key request code, wherein the lock is unlocked when the digital key, entered with the input, is authentic. In an embodiment, the lock comprises an electronic lock.

In an embodiment, the digital key request code comprises a QR code. In an embodiment, the digital key comprises a string of numbers. In an embodiment, the digital key comprises a unique digital key every time the digital key is requested using the digital key request code. In an embodiment, the display comprises a retail product display.

In an embodiment, the access cloud further comprises a mobile UI configured to require the user to input their phone number in order to receive the digital key. In an embodiment, the mobile UI provides the digital key to the user after the user enters their phone number. In an embodiment, the access cloud provides the digital key to the user as a text message using the phone number provided by the user.

In another embodiment, a secure display system comprises a display secured with a lock, a digital key request code, an access module configured to transmit a digital key to a user device when a digital key is requested using the digital key request code, and a digital key reader configured to unlock the lock when the digital key is authentic. In an embodiment, the lock comprises an electronic lock. In an embodiment, the display comprises a retail product display.

In an embodiment, the digital key request code comprises a QR code. In an embodiment, the digital key request code is provided proximate to the digital key reader. In an embodiment, the access module generates a unique digital key every time the digital key is requested using the digital key request code. In an embodiment, the digital key comprises a QR code. In an embodiment, the digital key reader comprises a camera configured to scan the QR code.

In another embodiment, a secure access method comprises providing a digital key request code on a dispenser, upon receiving a digital key request, requiring entry of a phone number via a web portal, providing a digital key to a user device, accepting input at the dispenser, the input comprising the digital key, authenticating the digital key, and unlocking a lock associated with a display when the digital key is authentic. In an embodiment, providing a digital key to a user device further comprises at least one of: providing the digital key to the user via a mobile UI and/or providing the digital key to the user as a text message using the phone number entered via the web portal. In an embodiment, the digital key comprises at least one of a QR code and/or a string of numbers.

It should be appreciated that variations of the above-disclosed and other features and functions, or alternatives thereof, may be desirably combined into many other different systems or applications. It should be understood that various presently unforeseen or unanticipated alternatives, modifications, variations, or improvements therein may be subsequently made by those skilled in the art which are also intended to be encompassed by the following claims.

What is claimed is:

1. A display system comprising:
a display secured with a lock;
a dispenser, the dispenser comprising:
a digital key request code provided on the dispenser and uniquely associated with the display; and
an input configured to accept entry of a unique digital key, the unique digital key comprising a code that can be authenticated by an authentication module; and
an access cloud configured to transmit the unique digital key to a user device when the unique digital key is requested using the digital key request code, the access cloud further comprising a mobile UI configured to require a user to input a phone number in order to request the unique digital key, wherein the lock is unlocked when the unique digital key, entered with the input on the dispenser, is authentic.

2. The display system of claim 1 wherein the lock comprises an electronic lock.

3. The display system of claim 1 where the digital key request code provided on the dispenser and uniquely associated with the display comprises a QR code.

4. The display system of claim 1 wherein the unique digital key comprises a string of numbers generated by a digital key module, when the unique digital key is requested using the digital key request code.

5. The display system of claim 4 wherein the unique digital key comprises a different unique digital key generated by the digital key module every time the digital key is requested using the digital key request code.

6. The display system of claim 1 wherein the display comprises a retail product display.

7. The display system of claim 1 wherein the digital key request code provided on the dispenser further comprises:
a printed code physically attached to the dispenser.

8. The display system of claim 7 wherein, the mobile UI provides the unique digital key to the user after the user enters their phone number using the mobile UI.

9. The display system of claim 7 wherein the access cloud provides the unique digital key, generated by a digital key module, to the user as a text message using the phone number provided by the user via the mobile UI.

10. A secure display system comprising:
a digital key request code uniquely associated with a product display having a lock;
an access module configured to transmit a digital key, generated by a digital key module, for the lock associated with the product display, to a user device when a digital key is requested using the digital key request code uniquely associated with the product display; and
a digital key reader configured to unlock the lock when the digital key is authentic.

11. The secure display system of claim 10 wherein the lock comprises an electronic lock.

12. The secure display system of claim 10 where the digital key request code uniquely associated with a product display comprises a QR code.

13. The secure display system of claim 10 where the digital key request code uniquely associated with a product display is provided proximate to the digital key reader.

14. The secure display system of claim 10 wherein the digital key module generates a unique digital key every time the digital key is requested using the digital key request code uniquely associated with a product display.

15. The secure display system of claim 10 wherein the display comprises a retail product display.

16. The secure display system of claim 10 wherein the digital key, generated by the digital key module, uniquely associated with a product display comprises a printed QR code affixed to the housing of the digital key reader.

17. The secure display system of claim 16 wherein the digital key reader comprises a camera configured to scan the QR code.

18. A secure access method comprising:
providing a digital key request code on a dispenser;
in response to receiving a request for a digital key using the digital key request code, generating a digital key with a digital key module, wherein the digital key is uniquely associated with the dispenser;
upon receiving a digital key request, requiring entry of a phone number via a mobile UI associated with a web portal;
providing the digital key, generated by the digital key module, to a user device, upon receiving the phone number via the web portal;
accepting input at the dispenser, the input comprising the digital key;
authenticating the digital key; and
unlocking a lock associated with a display when the digital key is authentic.

19. The secure access method of claim 18 wherein providing a digital key to a user device further comprises at least one of:
providing the digital key to a user via the mobile UI; and/or
providing the digital key to the user as a text message using the phone number entered via the web portal.

20. The secure access method of claim 18 wherein the digital key uniquely associated with the dispenser comprises at least one of:
a QR code; and/or
a string of numbers.

* * * * *